United States Patent
Takahashi

(10) Patent No.: US 9,432,536 B2
(45) Date of Patent: Aug. 30, 2016

(54) IMAGE FORMING APPARATUS, CONTROL METHOD THEREOF, AND STORAGE MEDIUM

(71) Applicant: CANON KABUSHIKI KAISHA, Tokyo (JP)

(72) Inventor: Yasuhiro Takahashi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 157 days.

(21) Appl. No.: 13/866,271

(22) Filed: Apr. 19, 2013

(65) Prior Publication Data

US 2013/0293908 A1    Nov. 7, 2013

(30) Foreign Application Priority Data

May 7, 2012   (JP) ................................ 2012-106317

(51) Int. Cl.
| | |
|---|---|
| *G06K 15/00* | (2006.01) |
| *H04N 1/00* | (2006.01) |
| *G03G 15/00* | (2006.01) |
| *G03G 15/23* | (2006.01) |

(52) U.S. Cl.
CPC ........ *H04N 1/00596* (2013.01); *G03G 15/602* (2013.01); *G03G 15/6529* (2013.01); *H04N 1/0058* (2013.01); *H04N 1/00578* (2013.01); *H04N 1/00586* (2013.01); *G03G 15/234* (2013.01); *G03G 2215/00928* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 5,299,296 A | * | 3/1994 | Padalino et al. | 358/1.13 |
| 5,377,016 A | * | 12/1994 | Kashiwagi et al. | 358/403 |
| 6,177,977 B1 | * | 1/2001 | Tanaka et al. | 355/26 |
| 6,185,381 B1 | * | 2/2001 | Nakahara et al. | 399/21 |
| 7,911,628 B2 | | 3/2011 | Yorimoto | |
| 2004/0190082 A1 | * | 9/2004 | Seto | H04N 1/207 358/474 |
| 2007/0013970 A1 | * | 1/2007 | Yorimoto | H04N 1/00933 358/474 |

(Continued)

FOREIGN PATENT DOCUMENTS

| | | |
|---|---|---|
| CN | 1897630 | 1/2007 |
| CN | 101727043 | 6/2010 |
| JP | 2008-185881 A | 7/2000 |

OTHER PUBLICATIONS

U.S. Appl. No. 13/859,078, Junya Arakawa, Apr. 9, 2013.

*Primary Examiner* — Marivelisse Santiago Cordero
*Assistant Examiner* — Neil R McLean
(74) *Attorney, Agent, or Firm* — Fitzpatrick, Cella, Harper & Scinto

(57) ABSTRACT

This invention provides a technique of preventing a collision between an original document and a printing material on a conveyance path which is partially shared for conveyance of them in an image forming apparatus. The image forming apparatus of one aspect of this invention, which includes a printing unit configured to convey a printing material via at least part of a conveyance path used for original document reading processing, and execute printing processing of an image on the printing material, executes if the original document reading processing is not being executed when the printing processing of the image on the printing material is instructed, the printing processing without waiting for completion of the reading processing, and executes, if the original document reading processing is being executed, the printing processing upon completion of the reading processing.

6 Claims, 25 Drawing Sheets

(56) References Cited

U.S. PATENT DOCUMENTS

| | | |
|---|---|---|
| 2008/0257950 A1 | 10/2008 | Kurokawa |
| 2009/0180787 A1 | 7/2009 | Bober |
| 2010/0110508 A1* | 5/2010 | Campbell .......... H04N 1/00567 358/498 |
| 2013/0135652 A1 | 5/2013 | Kobayashi |

* cited by examiner

F I G. 2
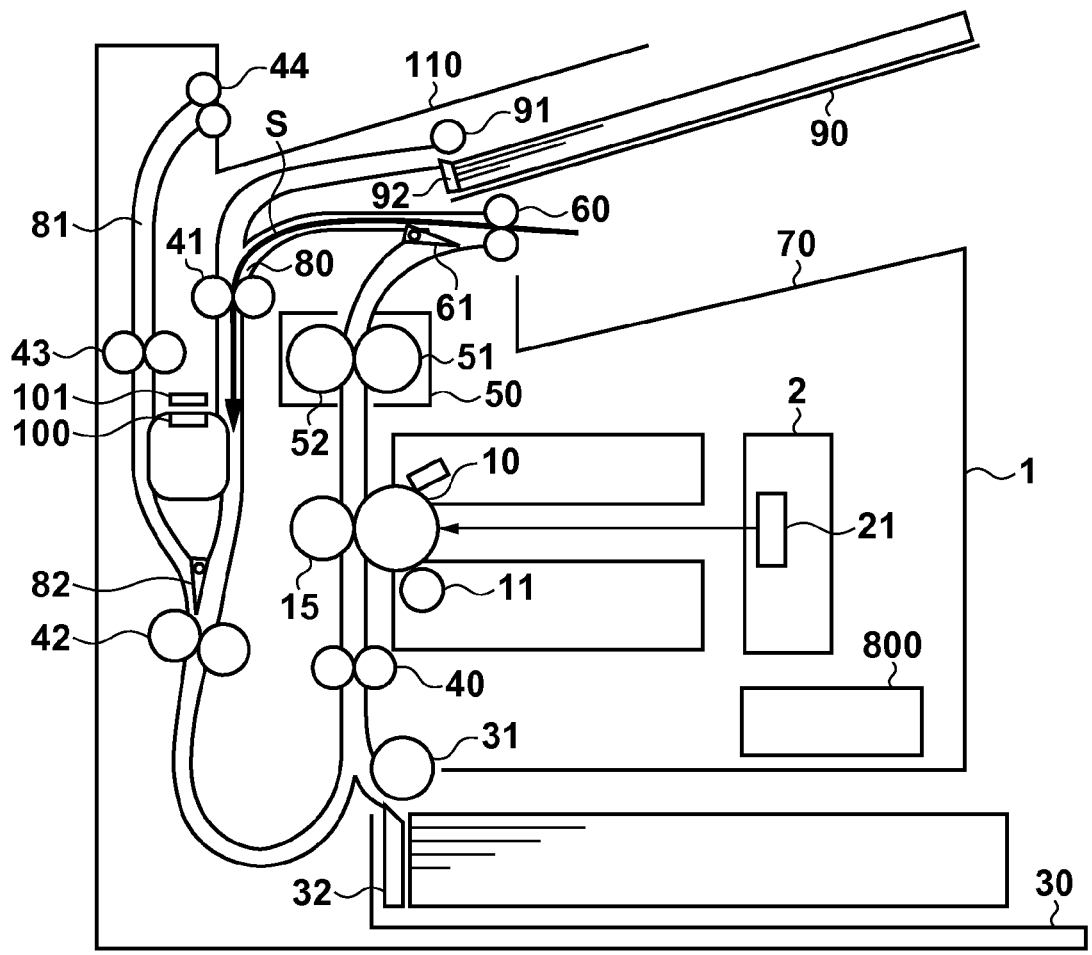

F I G. 4
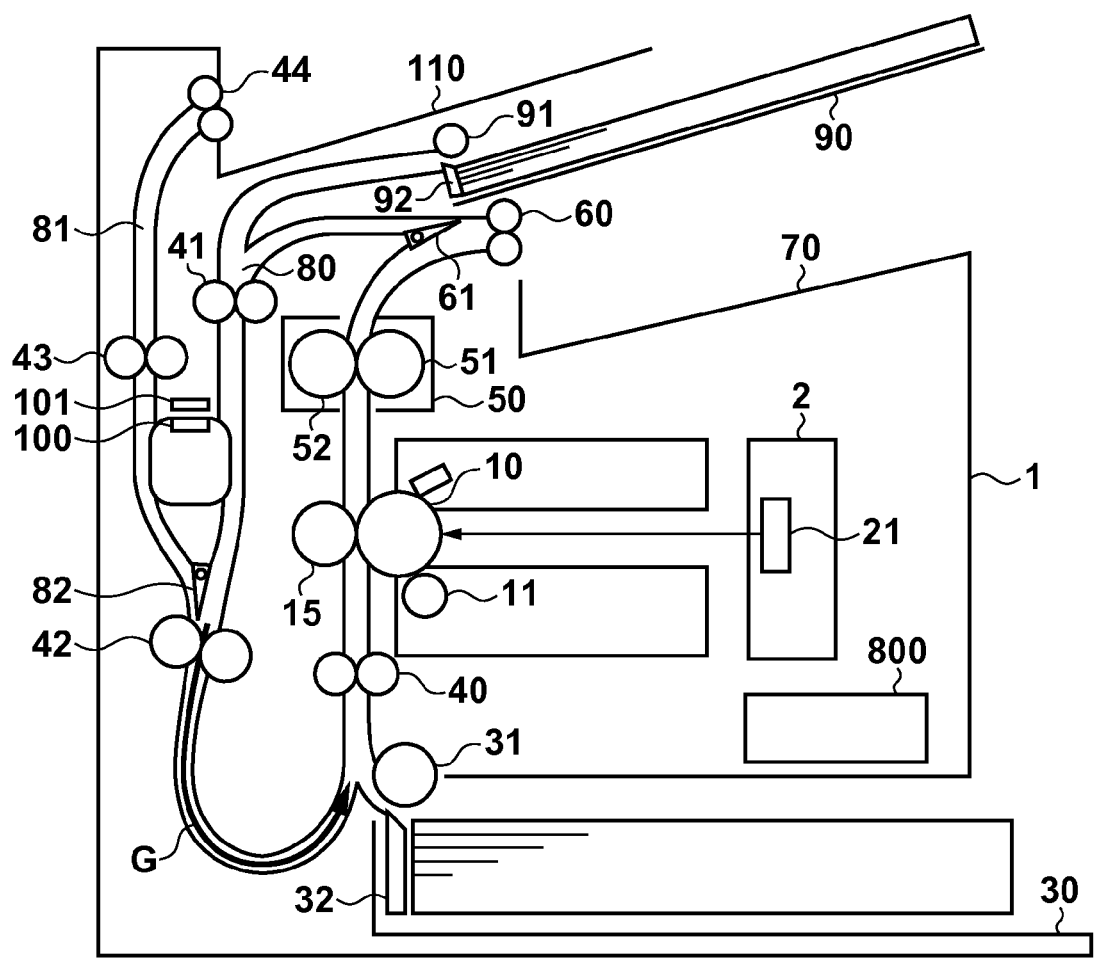

F I G. 11
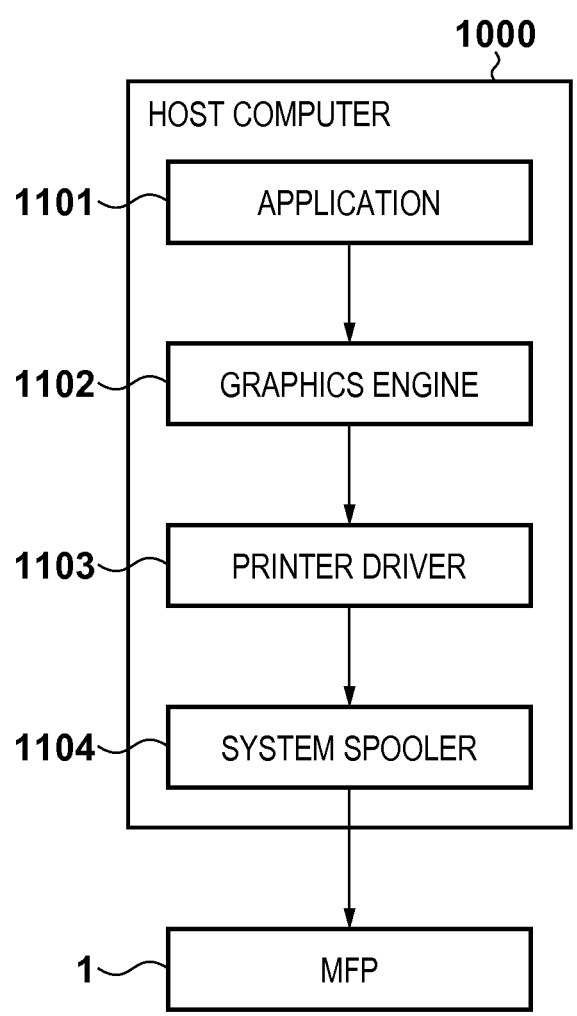

F I G. 18
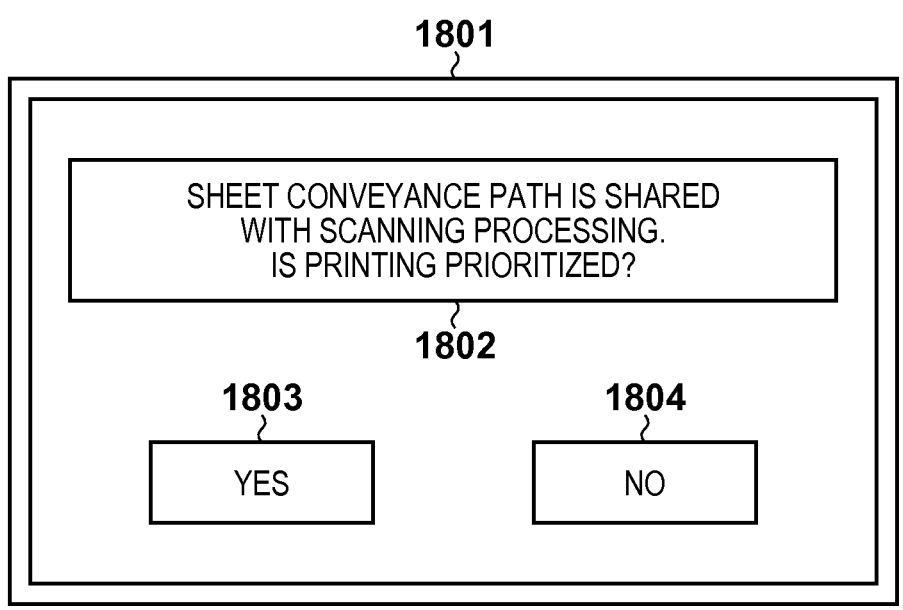

IMAGE FORMING APPARATUS, CONTROL METHOD THEREOF, AND STORAGE MEDIUM

BACKGROUND OF THE INVENTION

1. Field of the Invention

The present invention relates to an image forming apparatus, control method thereof, and storage medium.

2. Description of the Related Art

Conventionally, in an image forming image data, and prints an image on paper based on the image data, an original document conveyance path for conveying an original document, and a conveyance path for conveying a printing material such as print paper are configured independently. While reading an original document, the image forming apparatus executes processing of printing an image on a printing material.

In Japanese Patent Laid-Open No. 2000-185881, a reading unit is inserted in a printing material conveyance path extending from a sheet feeding unit to a discharge unit, thereby partially sharing the original document conveyance path and printing material conveyance path and downsizing the apparatus.

When the original document conveyance path and printing material conveyance path are partially shared, an original document and printing material may collide with each other on the common conveyance path to hinder the conveyance with each other.

SUMMARY OF THE INVENTION

The present invention has been made to solve the above problems. The present invention provide a technique of, in an image forming apparatus, preventing a collision between an original document and a printing material on a conveyance path when the original document conveyance path and printing material conveyance path are partially shared.

According to one aspect of the present invention, there is provided an image forming apparatus comprising: an execution unit configured to convey a printing material via at least part of a conveyance path used for reading processing for an original document, and execute printing processing of an image on the printing material; and a control unit configured to, if the printing processing on the printing material is not being executed when execution of the reading processing for the original document is instructed, execute the reading processing without waiting for completion of the printing processing, and if the printing processing on the printing material is being executed when execution of the reading processing for the original document is instructed, execute the reading processing upon completion of the printing processing.

According to another aspect of the present invention, there is provided an image forming apparatus comprising: a printing unit configured to convey a printing material via at least part of a conveyance path used for reading processing for an original document, and execute printing processing of an image on the printing material; and a control unit configured to, if the original document reading processing is not being executed when the printing processing of the image on the printing material is instructed, execute the printing processing without waiting for completion of the reading processing, and if the reading processing for the original document is being executed, execute the printing processing upon completion of the reading processing.

According to still another aspect of the present invention, there is provided a method of controlling an image forming apparatus, comprising: a printing step of conveying a printing material via at least part of a conveyance path used for reading processing for an original document, and executing printing processing of an image on the printing material; and a control step of, if the original document reading processing for the original document is not being executed when the printing processing of the image on the printing material is instructed, executing the printing processing without waiting for completion of the reading processing, and if the reading processing for the original document is being executed, executing the printing processing upon completion of the reading processing.

The present invention can provide a technique of, in an image forming apparatus, preventing a collision between an original document and a printing material on a conveyance path when the original document conveyance path and printing material conveyance path are partially shared.

Further features of the present invention will become apparent from the following description of exemplary embodiments (with reference to the attached drawings).

BRIEF DESCRIPTION OF THE DRAWINGS

FIG. 2 is a view for explaining a double-sided printing process in the MFP according to the first embodiment;

FIG. 4 is a view for explaining an operation at the end of reading the first surface serving as the obverse surface the original document in the MFP according to the first embodiment;

FIG. 11 is a block diagram showing a system arrangement pertaining to printing processing in the host computer according to the first embodiment;

FIG. 18 is a view exemplifying a printing priority setting screen according to the second embodiment;

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

First Embodiment

<Image Forming Apparatus (MFP)>

The first embodiment will describe an MFP (Multi Function Peripheral) having an image forming function and image reading function as an application example of an image forming apparatus according to the present invention. An image reading process and printing process in an MFP 1 will be explained with reference to FIGS. 1 to 9. The operation of the MFP 1 when the two sides of an original document G fed and conveyed from a second sheet feeding unit 90 are read and images read from the original document G are formed on the two sides of a sheet S fed and conveyed from a first sheet feeding unit 30 will be explained.

Figure 1:
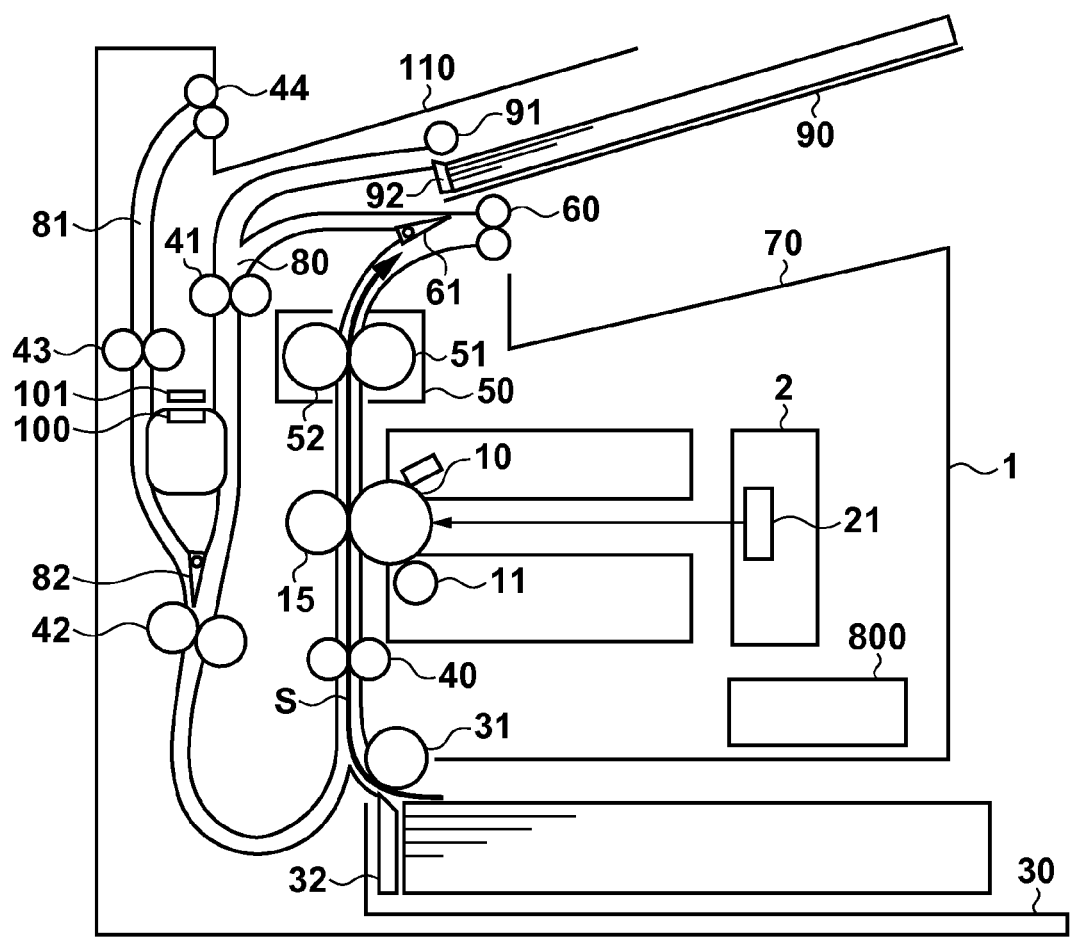
FIG. 1 is a schematic view showing the arrangement of an MFP according to the first embodiment.
Figure 3:
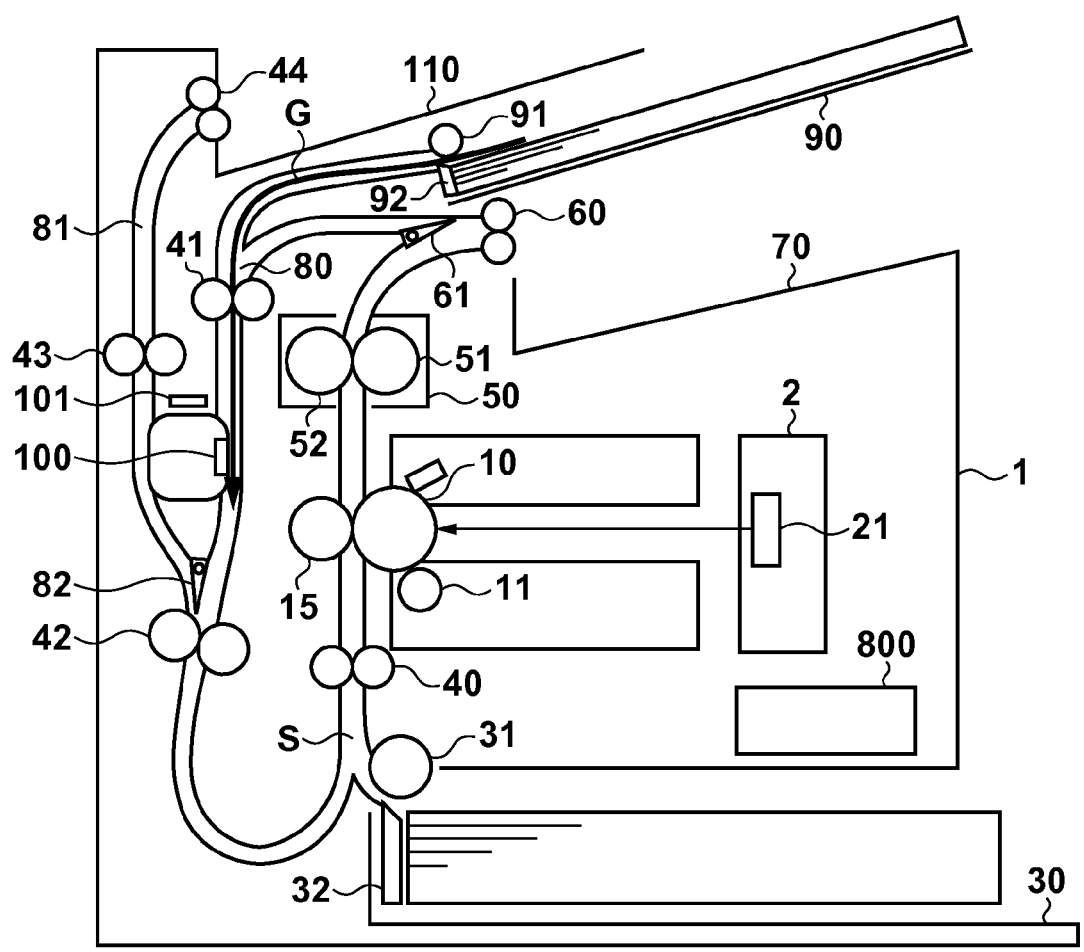
FIG. 3 is a view for explaining an operation at the start of reading the obverse surface of an original document in the MFP according to the first embodiment.

An example of the arrangement of the MFP will be explained with reference to FIG. 1. A rotatable photosensitive drum 10 serving as an image carrier, and a development roller 11 which is juxtaposed with the photosensitive drum 10 and rotates while holding toner are arranged at the center of the MFP 1. Upon receiving a printing signal, a light emitting unit 21 of an optical unit 2 emits a laser beam to the surface of the rotating photosensitive drum 10. A latent image is formed by charges on the surface of the photosensitive drum 10 irradiated with the laser beam. While rotating, the development roller 11 supplies the held toner to the latent image on the surface of the photosensitive drum 10. Then, the toner image is formed on the surface of the photosensitive drum 10.

Sheets S stored in the first sheet feeding unit 30 are conveyed one by one by a CST pickup roller 31 and a separator 32 to conveyance rollers 40. The conveyance rollers 40 convey the sheet S to a transfer unit 15 so that the toner image on the surface of the photosensitive drum 10 and the leading end position of the sheet S coincide with each other. The sheet (printing material) is a medium on which the MFP 1 can print an image, and can include media of various materials such as paper and an OHP sheet.

The toner image conveyed to the transfer unit 15 by rotation of the photosensitive drum 10 is transferred to the sheet S by an application bias and pressure supplied to the transfer unit 15. Further, the transfer unit 15 conveys the sheet S to a fixing unit 50. In the fixing unit 50, the toner image is fixed on the sheet S by heat from a rotatable heat roller 51, and the pressure of a rotatable press roller 52 facing the heat roller 51. The sheet S on which the toner image is fixed is conveyed to discharge rollers 60. For single-sided printing, the discharge rollers 60 discharge the sheet S from the apparatus, and the sheet S is stacked on a first discharge unit 70. An electric unit 800 to be described later with reference to FIG. 8 controls the respective components of the MFP 1. Note that a conveyance path through which a sheet fed and conveyed from the first sheet feeding unit 30 is printed and discharged to the first discharge unit 70 will be called the first conveyance path.

Next, a double-sided printing process will be explained with reference to FIG. 2. A double-sided flapper 61 switches the conveyance path after the trailing end of the sheet S passes through it. Then, the discharge rollers 60 rotate reversely to convey the sheet S to a double-sided conveyance path (second conveyance path) 80. The switched-back sheet S is conveyed to an image reading unit 100 via conveyance rollers 41. As shown in FIG. 2, the image reading unit 100 is arranged near the double-sided conveyance path 80. Then, the sheet S is conveyed to conveyance rollers 42 and the conveyance rollers 40, and conveyed again to the transfer unit 15. A toner image is transferred to the reverse surfaces (surface different from the transfer surface described with reference to FIG. 1) of the sheet S, and fixed. After that, the sheet S is stacked on the first discharge unit 70.

A process to read original document information and execute double-sided printing on a sheet will be explained with reference to FIGS. 3 to 7. First, an operation at the start of reading the first surface serving as the obverse surface of an original document will be explained with reference to FIG. 3. The original documents G stored in the second sheet feeding unit 90 are conveyed one by one by a CIS pickup roller 91 and separator 92 to the conveyance rollers 41. The image reading unit 100 executes emission to a white reference member 101 and correction of the white reference value till the start of reading the first surface serving as the obverse surface of the original document G fed from the second sheet feeding unit 90. Then, the image reading unit 100 rotates to a position (position shown in FIG. 3) where the image reading unit 100 faces the double-sided conveyance path 80. That is, the image reading unit 100 rotates to a position where it reads the image of the original document G conveyed through the double-sided conveyance path 80. The conveyance rollers 41 convey the original document G to the image reading unit 100. The image reading unit 100 already stands by at the position where it faces the double-sided conveyance path 80. Information read by the image reading unit 100 is stored as information of the first surface of the original document in an image memory 804 to be described later with reference to FIG. 8. Note that the white reference member 101 faces down to prevent attachment of dust.

Next, an operation at the end of reading the first surface serving as the obverse surface of an original document will be explained with reference to FIG. 4. The original document G having passed through the image reading unit 100 is conveyed to the conveyance rollers 42. The conveyance rollers 42 stop after the trailing end of the original document G passes through a switchback flapper 82. The original document G stops while being clamped by the conveyance rollers 42. After the lapse of a predetermined time, the conveyance rollers 42 rotate reversely to convey the original document G to an original document conveyance path (third conveyance path) 81. At this time, it is also possible to convey the original document G to the conveyance rollers 40 without stopping it at the conveyance rollers 42, read the first surface, and then supply it to the image forming process described with reference to FIG. 1.

Figure 5:
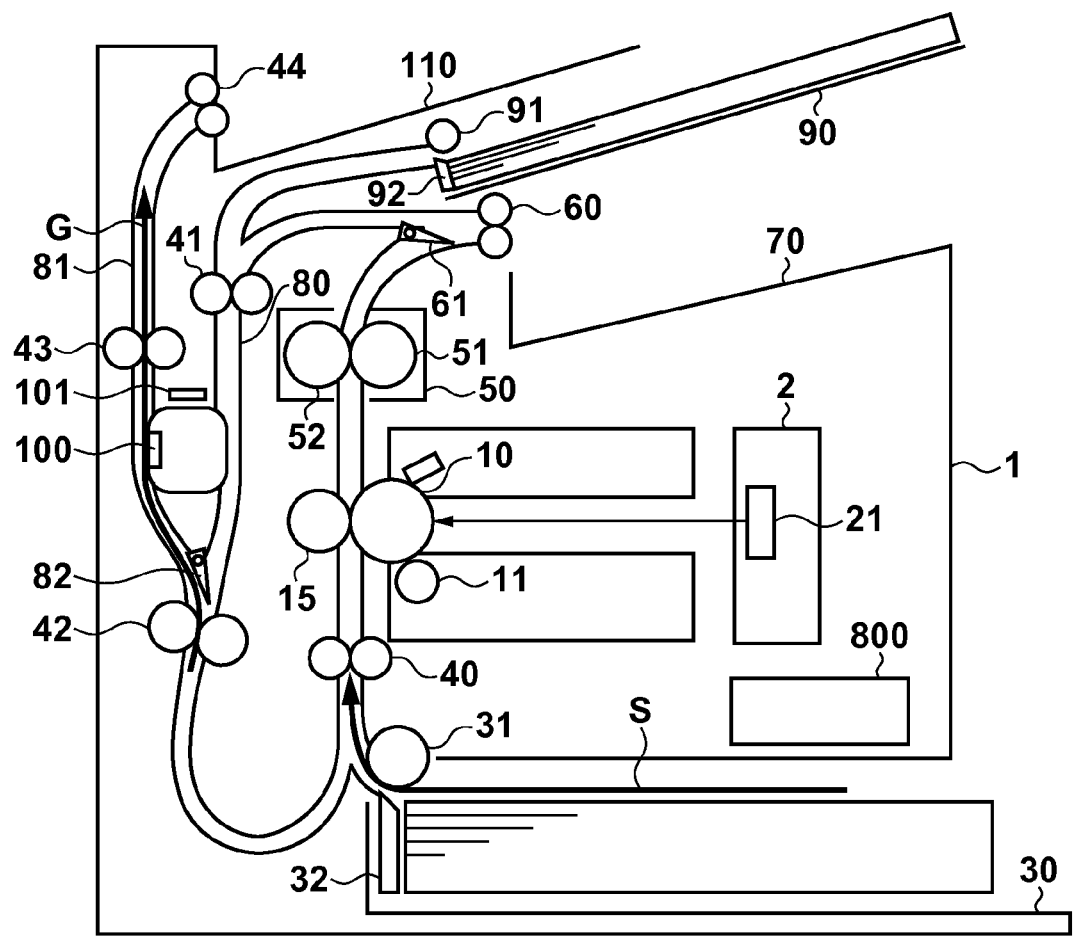
FIG. 5 is a view for explaining an operation at the start of reading the second surface serving as the reverse surface of the original document in the MFP according to the first embodiment.

Next, an operation at the start of reading the second surface serving as a surface reverse to the first surface will be explained with reference to FIG. 5. Simultaneously when the switchback flapper 82 switches the conveyance path from the double-sided conveyance path 80 to the original document conveyance path 81, the image reading unit 100 rotates to the position where it faces the original document conveyance path 81. That is, the image reading unit 100 rotates to a position where it reads the image of a sheet conveyed through the original document conveyance path 81. When the conveyance rollers 42 rotate reversely, the original document G is conveyed to the image reading unit 100 along the original document conveyance path 81. When the original document G is conveyed to the image reading unit 100 and passes through it, information of the second surface serving as the reverse surface of the original document is read and stored as information of the second surface of the original document in the image memory 804. In this manner, the image reading unit 100 is interposed between the double-sided conveyance path 80 and the original document conveyance path 81, and is freely movable to read the images of sheets conveyed through these two conveyance paths.

After the start of reading of the second surface of the original document G, the sheets S fed from the first sheet feeding unit 30 are conveyed one by one to the conveyance rollers 40. At almost the same time, a latent image is formed on the photosensitive drum 10 in accordance with the previous image information by the light emitting unit 21 based on the read image of the second surface serving as the reverse surface of the original document that is stored in the image memory 804. After the transfer unit 15 transfers, to the sheet S, a toner image formed based on the latent image, the sheet S is conveyed to the fixing unit 50, completing image formation of the second surface of the original document. In FIG. 5, feeding of the sheet S starts at the same time as the start of reading information of the second surface serving as the reverse surface of the original document. However, the sheet S may be conveyed after reading information of the second surface.

Figure 6:
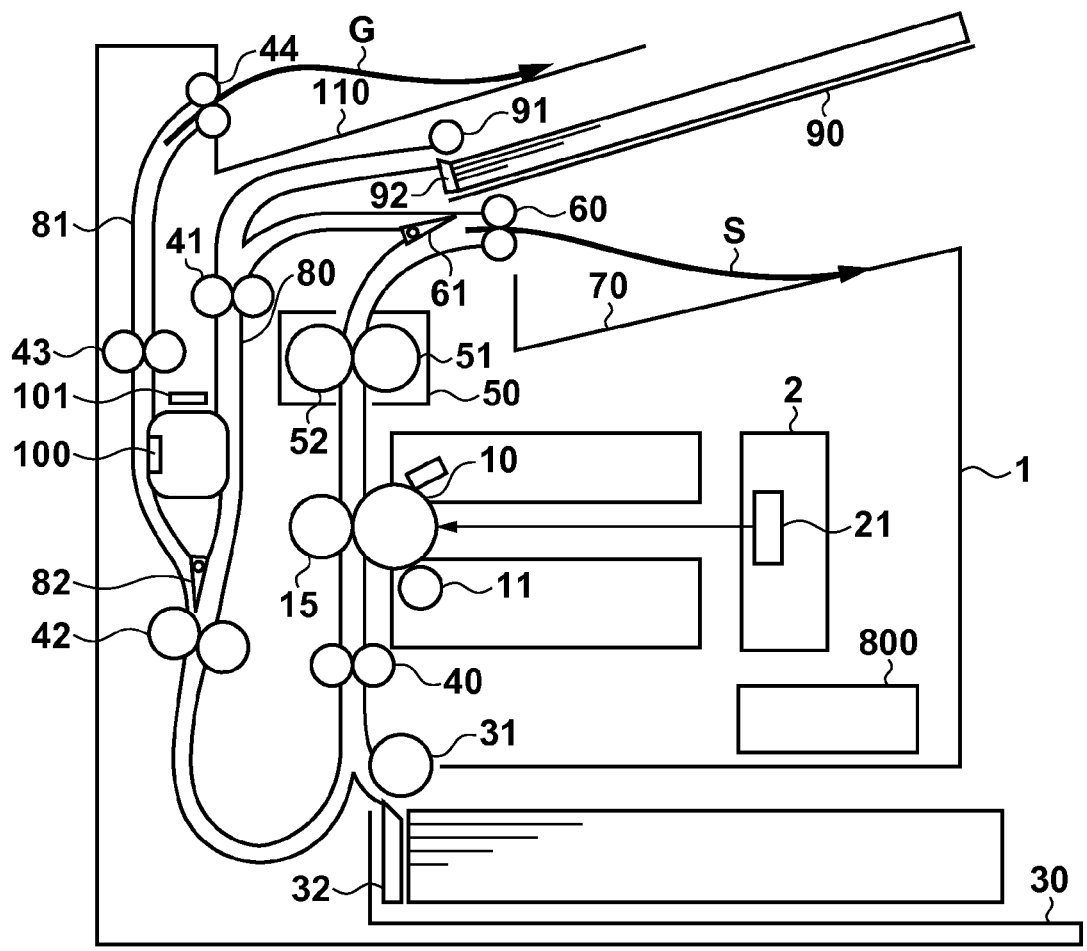
FIG. 6 is a view for explaining an operation at the end of reading the reverse surface of the original document in the MFP according to the first embodiment.

Next, an operation at the end of reading the reverse surface of the original document will be explained with reference to FIG. 6. The original document G having undergone image reading is conveyed to conveyance rollers 43 and 44, and stacked on a second discharge unit 110. By using a sensor (not shown) arranged before the switchback flapper in the conveyance direction, the switchback flapper 82 detects that the trailing end of the original document G has passed. The conveyance path is then switched from the original document conveyance path 81 to the double-sided conveyance path 80 to convey, toward the conveyance rollers 40, the sheet S for which double-sided printing has started. The discharge rollers 60 reversely rotate to convey, toward the double-sided conveyance path 80 switched by the double-sided flapper 61, the sheet S having undergone image formation of the second surface read from the original document G, in order to form an image on the reverse surface (first surface). At this time, the sheet S is not conveyed to the double-sided conveyance path 80. Instead, the original document G is stopped at the conveyance rollers 44, and the conveyance rollers 44 rotate reversely to return the original document G to the original document conveyance path 81. Then, the original document G passes through the conveyance rollers 43 and 42, and is conveyed to the conveyance rollers 40. Image formation can therefore be performed on the original document G having undergone double-sided reading.

Figure 7:
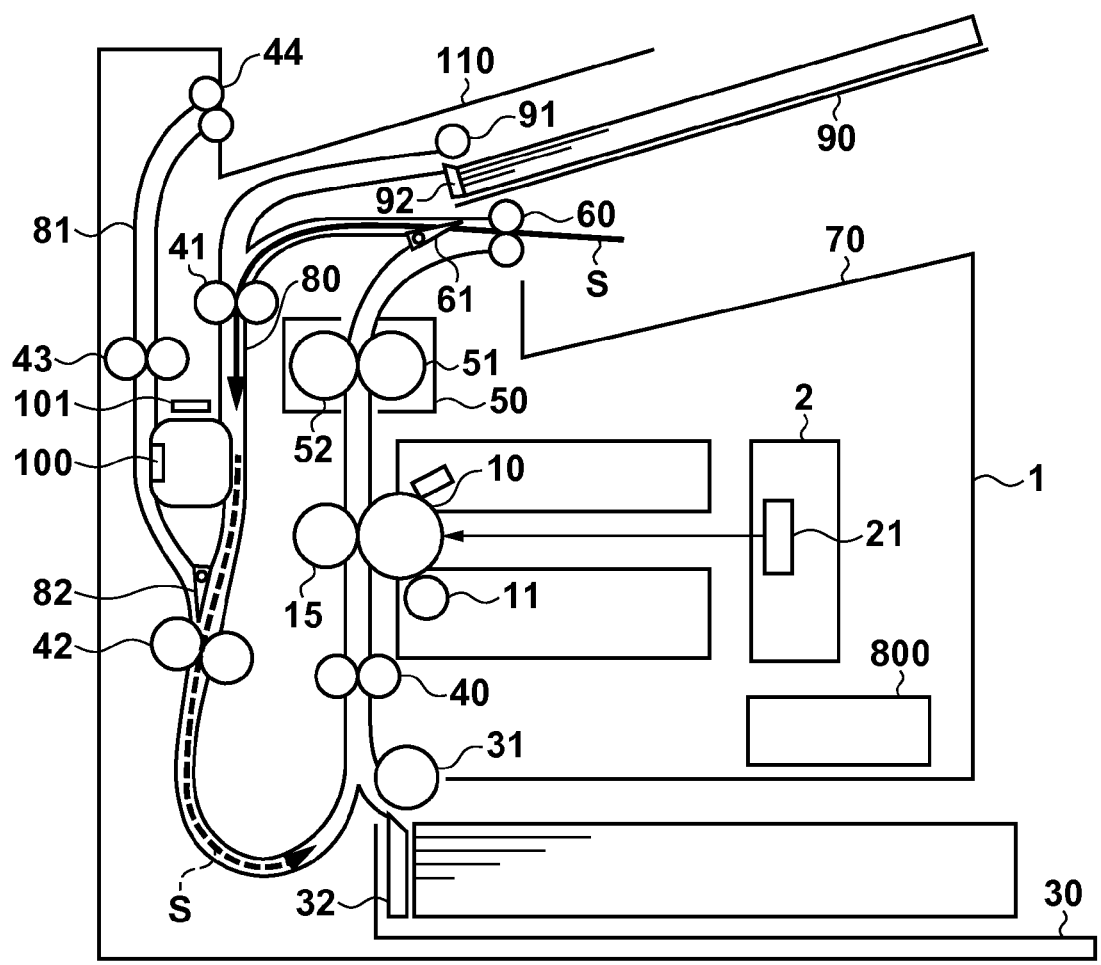
FIG. 7 is a view for explaining an operation upon completion of image formation on a sheet S in the MFP according to the first embodiment.

Next, an operation upon completion of image formation on the sheet S will be explained with reference to FIG. 7. The sheet S conveyed to the double-sided conveyance path 80 passes through the reversed image reading unit 100, and is conveyed to the conveyance rollers 40 via the conveyance rollers 42. Further, the sheet S is conveyed again to the transfer unit 15, as indicated by a broken line. Since image formation of the second surface of the original document on the sheet S has already ended, the image of the first surface of the original document is formed based on the image information of the first surface of the original document stored in the image memory 804. More specifically, a toner image is transferred to and fixed on the sheet S by an image forming unit formed from the optical unit 2, photosensitive drum 10, development roller 11, transfer unit 15, and fixing unit 50. Thereafter, the sheet S is discharged and stacked on the first discharge unit 70.

As described above, the conveyance path for the original document G and the conveyance path for the sheet S are partially shared in the MFP 1 according to the first embodiment. More specifically, a conveyance path for reading the first surface of the original document G, and a conveyance path for performing double-sided printing on the sheet S are shared. The double-sided conveyance path (second conveyance path) 80 is used to convey a sheet having undergone printing on the first surface to the transfer unit 15 again in order to print on the second surface different from the first surface when executing double-sided printing on the sheet S. The double-sided conveyance path (second conveyance path) 80 is also used as a conveyance path for the original document G. In this way, the present embodiment can downsize the apparatus.

<Control Unit of MFP>

Figure 8:
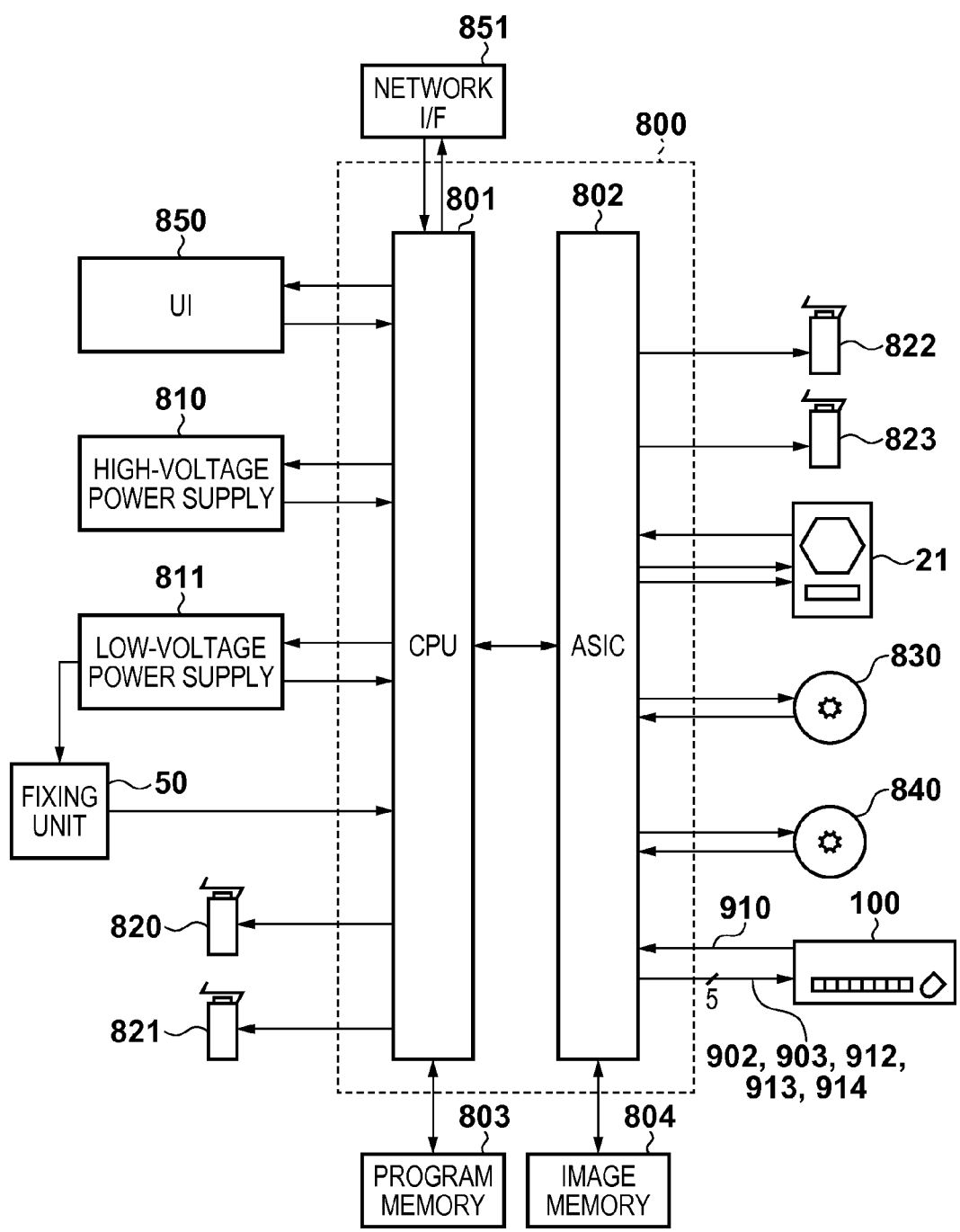
FIG. 8 is a view for explaining the operation of a control CPU in the MFP according to the first embodiment.

The operations of a control CPU 801 and ASIC 802 in an image forming operation according to the first embodiment will be described with reference to FIG. 8. FIG. 8 shows the arrangement of respective units to be controlled by the control CPU 801. As shown in FIG. 8, the control CPU 801 is connected via the ASIC 802 to the light emitting unit 21 including a polygon mirror, motor, laser emitting element, and the like. The control CPU 801 outputs a control signal to the ASIC 802 to control the optical unit 2 in order to form a desired latent image by scanning the surface of the photosensitive drum 10 with a laser beam. Similarly, control CPU 801 controls a driving system including a driving system including a main motor 830 for driving the CST pickup roller 31, conveyance rollers 40, photosensitive drum 10, transfer unit 15, heat roller 51, and press roller 52 in order to convey the sheet S. The control CPU 801 also controls a driving system including a CST sheet feeding solenoid 822 which is turned on at the start of driving a sheet feed roller for feeding the sheet S, and drives the CST pickup roller 31. Further, the control CPU 801 controls a driving system including a double-sided driving motor 840 for driving the CIS pickup roller 91 and the conveyance rollers 41 to 44.

Further, the control CPU 801 controls a high-voltage power supply 810 which controls a primary charge bias, development bias, primary transfer bias, and secondary transfer bias necessary for an electrophotographic process, the fixing unit 50, and a low-voltage power supply 811. The control CPU 801 monitors a temperature by using a thermistor (not shown) arranged in the fixing unit 50, and controls to keep the fixing temperature constant. The control CPU 801 is connected to a program memory 803 via a bus (not shown) or the like. The program memory 803 stores programs and data for executing all or some processes to be performed by the control CPU 801 in the above-described control and embodiments described in this specification. That is, the control CPU 801 executes operations according to embodiments of the present invention by using programs and data stored in the program memory 803.

The control CPU 801 receives, from a user interface (UI) 850, a signal representing an instruction input by the user via the UI 850. The control CPU 801 receives signals such as a print control command via a network interface (I/F) 851 from an external apparatus such as a network-connected host computer (a host computer 1000 shown in FIG. 10). The control CPU 801 performs various control operations described above based on signals received from the UI 850 and signals received via the network I/F.

The ASIC 802 performs speed control of the internal motor of the light emitting unit 21 and speed control of the main motor 830 and double-sided driving motor 840 based on instructions from the control CPU 801. In the motor speed control, a tachometer signal (pulse signal output from a motor every time the motor rotates) from a motor (not shown) is detected, and an acceleration or deceleration signal is output to the motor so that the interval between detected tachometer signals becomes a predetermined time. The control circuit formed from the hardware circuit of the ASIC 802 can reduce the control load on the control CPU 801. The control CPU 801 starts the image forming operation in accordance with an instruction from the user via the UI 850 or upon receiving a print control command (from the host computer 1000 shown in FIG. 10) via the network I/F 851. More specifically, first, the control CPU 801 conveys the sheet S by driving the main motor 830, double-sided driving motor 840, and CST sheet feeding solenoid 822. The transfer unit 15 transfers, to the sheet S, a toner image formed on the surface of the photosensitive drum 10, and the fixing unit 50 fixes the toner image. Then, the sheet S is discharged by the discharge rollers 60 to the first discharge unit 70 serving as a sheet stacking unit. To improve alignment of image-formed sheets, the first discharge unit 70 has a gentle up slope formed from the vicinity of the discharge port in the sheet discharge direction. The control CPU 801 supplies predetermined power to the fixing unit 50 via the low-voltage power supply 811 to generate a desired amount of heat and supply the heat to the sheet S, thereby fusing and fixing the toner image on the sheet S.

An original document reading (scanning) operation will be explained. The control CPU 801 starts the original document reading operation in accordance with an instruction from the user via the UI 850 or upon receiving a scan control command via the network I/F 851. More specifically, first, the control CPU 801 drives a double-sided flapper solenoid 820 and the double-sided driving motor 840. Further, the control CPU 801 operates an original document feeding flapper solenoid 823 to transmit the torque of the double-sided driving motor 840 to the CIS pickup roller 91 and convey the original document G. The image reading unit 100 is connected to the ASIC 802 via a signal line capable of transmitting various control signals CISLED, CISSTART, SYSCLK, Sl_in, Sl_select, and Sl_out (to be described later). The control CPU 801 saves, in the image memory 804 connected to the ASIC 802, an image obtained by reading by the image reading unit 100 in various control operations via the ASIC 802. After that, the control CPU 801 operates a switchback solenoid 821 to switch the switchback flapper 82 to the original document conveyance path 81, reversely rotate the double-sided driving motor 840, and convey the original document G to the second discharge unit 110.

<Image Reading Unit of MFP>

Figure 9:
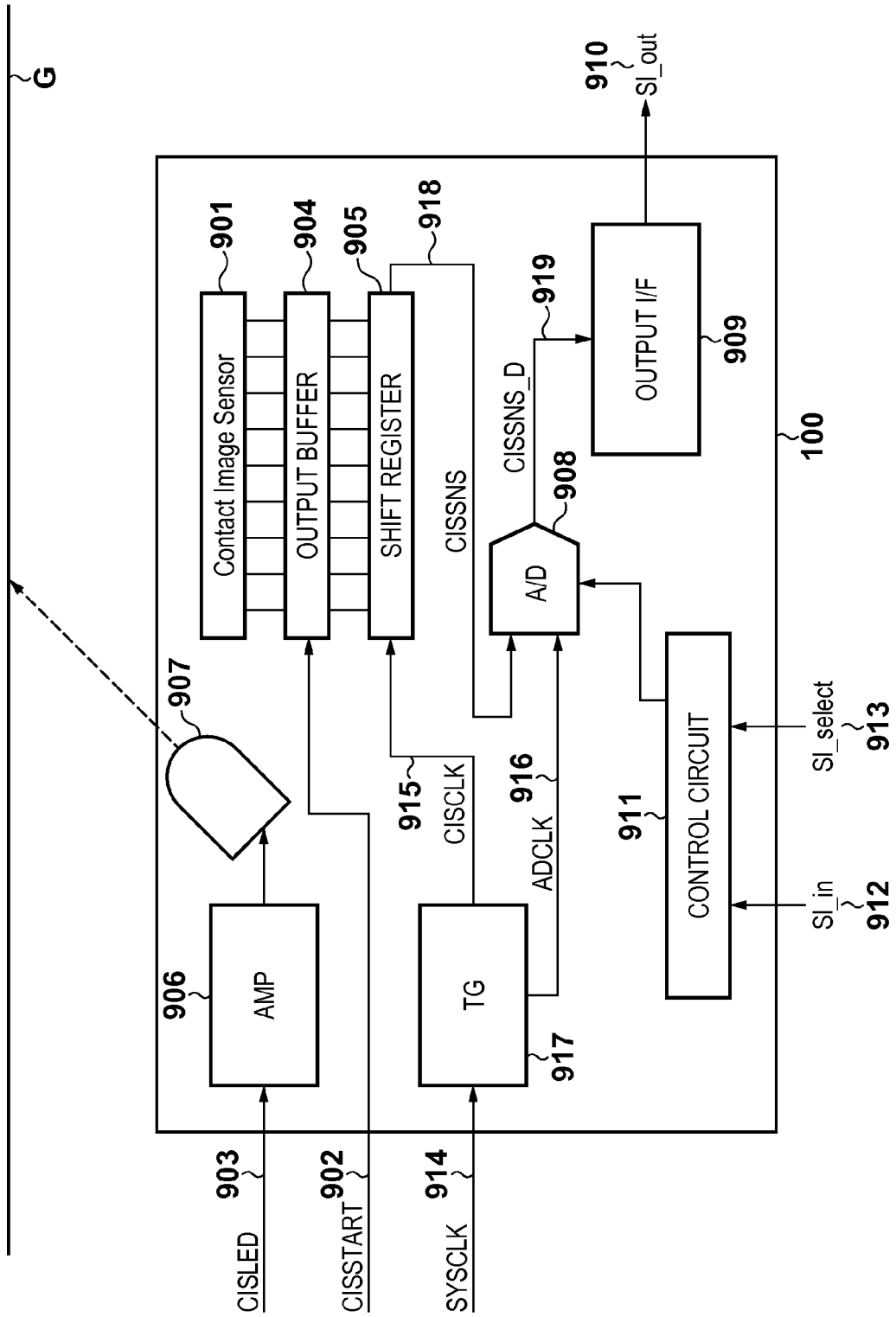
FIG. 9 is a view showing the arrangement of an image reading unit in the MFP according to the first embodiment.

Details of the image reading unit 100 will be described with reference to FIG. 9. FIG. 9 is a circuit block diagram of a CIS (Contact Image Sensor) sensor. In a contact image sensor 901, photodiodes for 10,368 pixels are arrayed at a specific main scanning density (for example, 1,200 dpi). A start pulse CISSTART signal 902 and transfer clock CISCLK 915 are supplied to the CIS sensor. A system clock SYSCLK 914 determines the operating speed of the CIS sensor. Reference numeral 908 denotes an A/D converter. A CIS sampling clock ADCLK 916 decides the sampling rate of the A/D converter 908. Reference numeral 917 denotes a timing generator; 904, an output buffer; 905, a shift register; 903, a light emitting element control signal CISLED; and 906, a current amplifier. A light emitting element 907 uniformly irradiates the original document G.

Subsequently, the operation of the image reading unit 100 will be explained. When the CISSTART signal 902 becomes active, the CIS sensor 901 starts accumulating charges based on received light, and sequentially sets data in the output buffer 904. Then, the transfer clock CISCLK 915 (for example, about 500 kHz to 1 MHz) is supplied, and the shift register 905 transfers the data set in the output buffer 904 as a CISSNS signal 918 to the A/D converter 908. The CISSNS signal 918 has a predetermined data assurance area, and thus needs to be sampled a predetermined time after the leading edge of the transfer clock CISCLK 915. The CISSNS signal 918 is output in synchronism with both the leading and trailing edges of the transfer clock CISCLK 915. Hence, the frequency of the CIS sampling clock ADCLK 916 is generated to be double the transfer clock CISCLK 915. The CISSNS signal 918 is sampled at the leading edge of the CIS sampling clock ADCLK 916.

The timing generator 917 divides the frequency of the system clock SYSCLK 914, generating the CIS sampling clock ADCLK 916 and transfer clock CISCLK 915. The phase of the CIS sampling clock ADCLK 916 is delayed from that of the transfer clock CISCLK 915 by the data assurance area.

The CISSNS signal 918 converted into a digital signal by the A/D converter 908 is output as a CISSNS_D signal 919 to an output interface circuit 909. The CISSNS_D signal 919 is controlled at a predetermined timing by the output interface circuit 909, and output as serial data by an Sl_out signal 910. At this time, an analog output reference voltage is output for the CISSNS signal 918 corresponding to a predetermined number of pixels from the start pulse (CIS-START signal) 902, and these pixels cannot be used as effective pixels.

A control circuit 911 can variably control the A/D conversion gain of the A/D converter 908 in accordance with an Sl_in signal 912 and Sl_select signal 913. For example, when the contrast of a captured image cannot be obtained, the control CPU 801 increases the A/D conversion gain of the A/D converter 908 to increase the contrast, and an image can always be captured with a best contrast.

A system in which all pixels are output as one output CISSNS signal 918 has been described. However, pixels may be divided into respective areas for high-speed reading, and A/D conversion may be performed simultaneously in a plurality of areas. In the above description, the image reading unit 100 uses the CIS sensor. However, the present invention is not limited to this, and a CMOS sensor, CCD sensor, or the like is also applicable.

<Arrangement of Host Computer>

Figure 10:
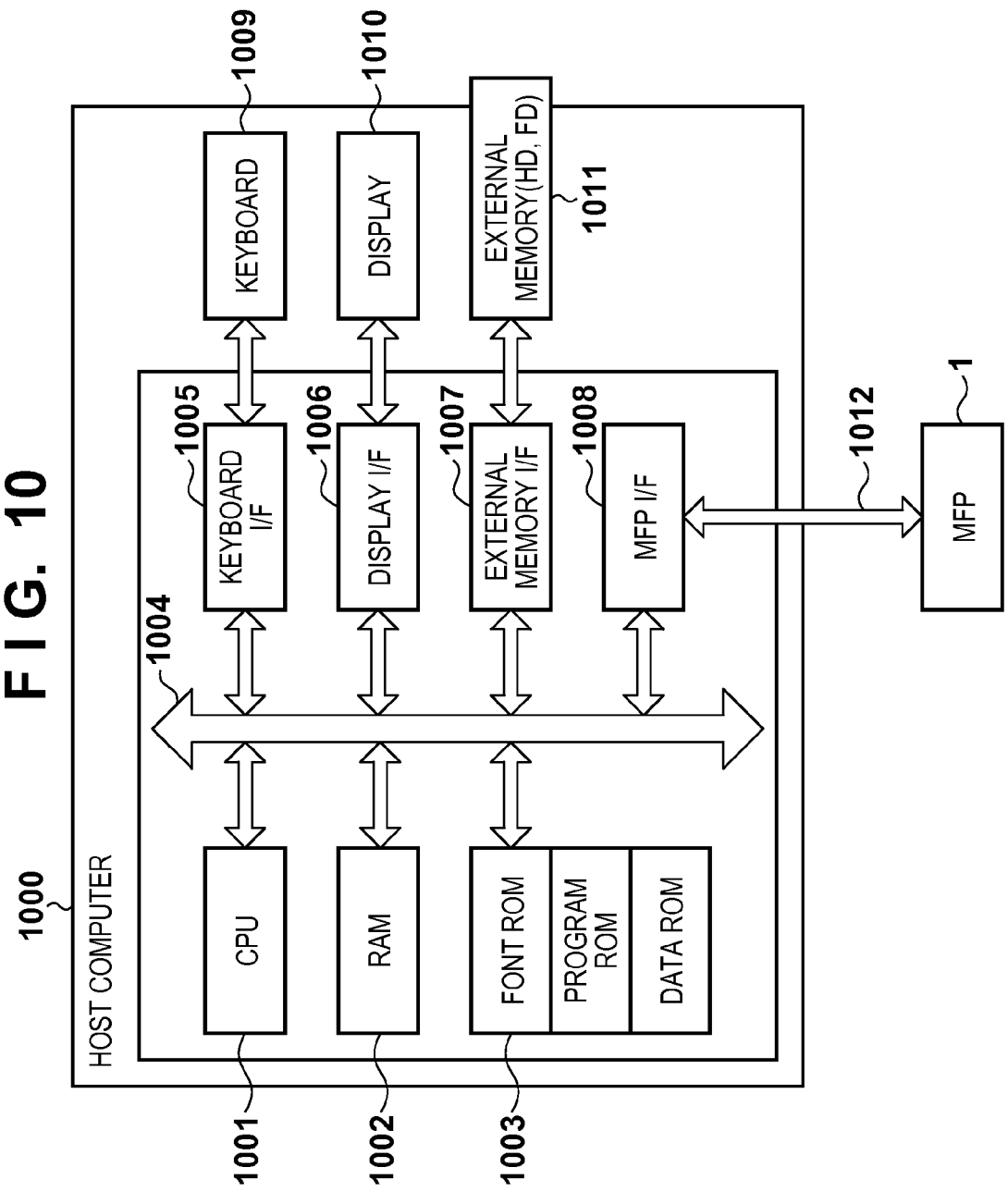
FIG. 10 is a block diagram showing the hardware arrangement of a host computer according to the first embodiment.

Next, the hardware arrangement of the host computer 1000 will be explained with reference to FIG. 10. The host computer 1000 includes a CPU 1001, RAM 1002, ROM 1003, keyboard interface (I/F) 1005, display I/F 1006, external memory I/F 1007, and MFP I/F 1008. These devices are connected to a system bus 1004.

The CPU 1001 controls the operation of the host computer 1000 by controlling the respective devices connected to the system bus 1004. The CPU 1001 controls the operation of the host computer 1000 by reading out various programs stored in the program ROM of the ROM 1003 or an external memory 1011 to the RAM 1002 and executing them. For example, based on a document processing program stored in the program ROM of the ROM 1003 or the external memory 1011, the CPU 1001 can execute processing for a document in which a figure, image, text, table, and the like coexist.

The program ROM of the ROM 1003 or the external memory 1011 stores an operating system program (OS) and the like serving as control programs for the CPU 1001. The font ROM of the ROM 1003 or the external memory 1011 stores various data such as font data to be used by the CPU 1001 when executing the document processing.

The RAM 1002 functions as a main memory, work area, and the like for the CPU 1001. The keyboard I/F 1005 controls key inputs from a keyboard 1009, a pointing device (not shown), and the like. The display I/F 1006 controls display on a display 1010. The external memory I/F 1007 controls access to the external memory 1011 such as a hard disk (HD) or Floppy® disk (FD), and access from the external memory 1011. The external memory 1011 stores a boot program, various applications, font data, user files, edit files, a scanner driver, a printer driver, and the like. The MFP I/F 1008 is connected to the MFP 1 via a predetermined two-way interface 1012, and executes communication control processing for controlling communication between the host computer 1000 and the MFP 1.

The CPU 1001 executes, for example, outline font rasterization processing to a display information RAM ensured in the RAM 1002, and enables WYSIWYG on the display 1010. The CPU 1001 opens various registered windows based on commands (instructions) input using the pointing device (not shown) of the display 1010, and executes various data processes. When instructing execution of printing, the user opens a window pertaining to printing settings, and can execute setting of a printing processing method for the printer driver, including setting of a printer and selection of a printing mode. This also applies to a case in which the user instructs execution of scanning.

<Arrangement Coping with Printing Processing>

A software arrangement associated with printing processing in the host computer 1000 connected to the MFP 1 will be explained with reference to FIG. 11. The host computer 1000 may be connected to the MFP 1 directly by USB connection or the like or via a network such as a LAN.

As files (program modules) saved in the external memory 1011, the host computer 1000 includes an application 1101, graphics engine 1102, printer driver 1103, and system spooler 1104. When executing these program modules, the CPU 1001 reads (loads) them out from the external memory 1011 to the RAM 1002. In the host computer 1000, the application 1101 and printer driver 1103 can be installed using an FD or CD-ROM (not shown) serving as the external memory 1011, or downloaded via a network and installed. The installed application 1101 and printer driver 1103 can be saved in an HD serving as the external memory 1011.

The application 1101 saved in the external memory 1011 is loaded to the RAM 1002 and executed. When the host computer 1000 instructs the MFP 1 to print, the application 1101 is loaded to the RAM 1002 and outputs (renders) print data by using the executable graphics engine 1102. The graphics engine 1102 loads, from the external memory 1011 to the RAM 1002, the printer driver 1103 prepared for each printing apparatus such as the MFP 1. Further, the graphics engine 1102 converts print data output from the application 1101 into a printer control command by using the printer driver 1103. The system spooler 1104 loaded to the RAM 1002 by the OS transmits (outputs) the converted printer control command to the MFP 1 via the interface 1012.

Figure 12:
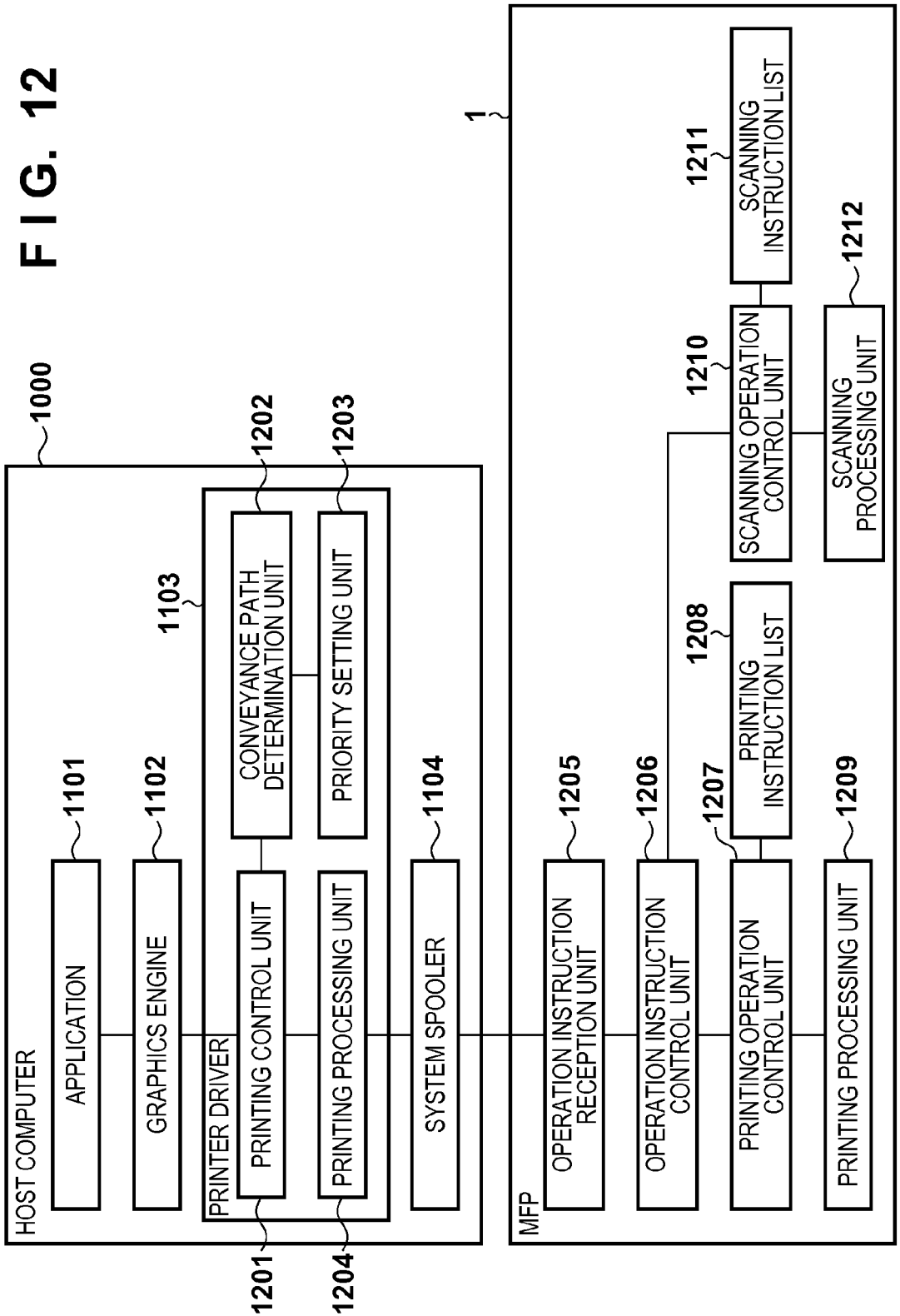
FIG. 12 is a block diagram showing an arrangement pertaining to printing processing in a system including the MFP and host computer according to the first embodiment.

Next, the detailed arrangements of the printer driver 1103 and each functional unit which is included in the MFP 1 and pertains to printing processing will be described with reference to FIG. 12. In the embodiment, the printer driver 1103 performs control regarding print data. The printer driver 1103 includes a printing control unit 1201, conveyance path determination unit 1202, priority setting unit 1203, and printing processing unit 1204. The printing control unit 1201 controls the overall processing of the printer driver 1103. When causing the MFP 1 to print based on print data and a printing instruction received from the graphics engine 1102, the conveyance path determination unit 1202 determines whether the sheet conveyance path and original document conveyance path are common. When the conveyance path determination unit 1202 determines that the conveyance paths are common, the priority setting unit 1203 sets the priority of printing processing. The printing processing unit 1204 performs predetermined processing for print data.

As functional units for executing respective functions, the MFP 1 includes an operation instruction reception unit 1205, operation instruction control unit 1206, printing operation control unit 1207, printing processing unit 1209, scanning operation control unit 1210, and scanning processing unit 1212. The operation instruction reception unit 1205 receives an operation instruction such as printing or scanning from the host computer 1000. The operation instruction control unit 1206 manages and controls all operation instructions received from the host computer 1000.

The operation instruction control unit 1206 controls the operations of the printing operation control unit 1207 and scanning operation control unit 1210. The printing operation control unit 1207 controls a printing operation by the printing processing unit 1209 in correspondence with a printing instruction from the host computer 1000. The scanning operation control unit 1210 controls a scanning operation by the scanning processing unit 1212 in correspondence with a scanning instruction from the host computer 1000. The printing operation control unit 1207 and scanning operation control unit 1210 include a printing instruction list 1208 and scanning instruction list 1211, respectively, for managing operation instructions from the host computer 1000 in the reception (input) order together with the input times.

<Arrangement Coping with Reading Processing (Scanning Processing)>

Figure 13:
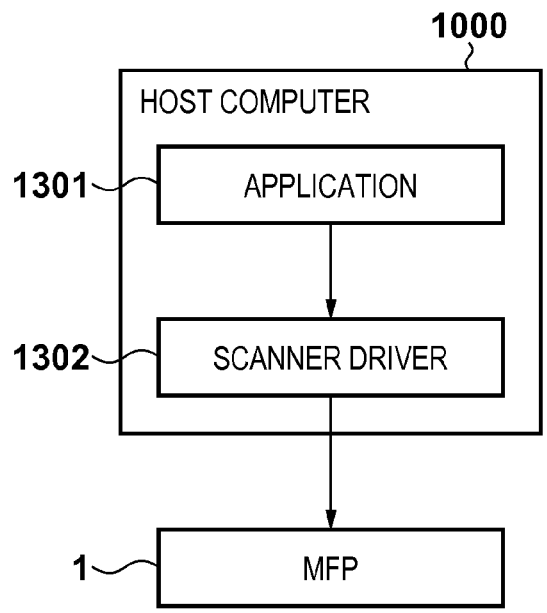
FIG. 13 is a block diagram showing a system arrangement pertaining to scanning processing in the host computer according to the first embodiment.

A software arrangement associated with reading processing (scanning processing) in the host computer 1000 connected to the MFP 1 will be explained with reference to FIG. 13. The host computer 1000 includes an application 1301 and scanner driver 1302 as files (program modules) saved in the external memory 1011. When executing these program modules, the CPU 1001 loads them from the external memory 1011 to the RAM 1002. In the host computer 1000, the application 1301 and scanner driver 1302 can be installed using an FD or CD-ROM (not shown) serving as the external memory 1011, or downloaded via a network and installed. The installed application 1301 and scanner driver 1302 can be saved in an HD serving as the external memory 1011.

The application 1301 saved in the external memory 1011 is loaded to the RAM 1002 and executed. When the host computer 1000 instructs the MFP 1 to scan an original document G set in the second sheet feeding unit 90, the application 1301 controls the scanner driver 1302 by using a protocol defined by the Twain standard. The scanner driver 1302 instructs the MFP 1 to scan the original document G by transmitting a scanning control command to the MFP 1 by using a protocol defined by the SCSI standard. The scanner driver 1302 receives image data corresponding to an image read from the original document G in the MFP 1. Note that protocols used between the application 1301 and scanner driver 1302 and the MFP 1 are not limited to the above ones, and another protocol may be used.

Figure 14:
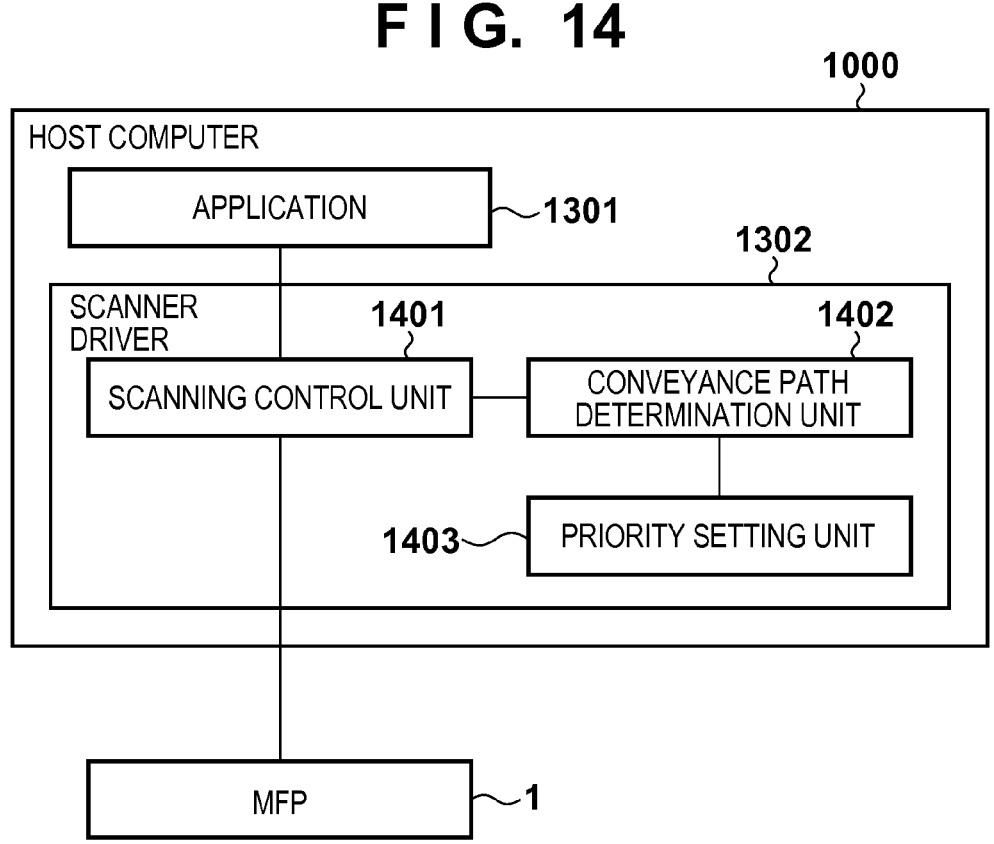
FIG. 14 is a block diagram showing an arrangement pertaining to scanning processing in the system including the MFP and host computer according to the first embodiment.

Next, the detailed arrangement of the scanner driver 1302 will be described with reference to FIG. 14. Note that the arrangement of the respective functional units of the MFP 1 is the same as that in FIG. 12, and a description thereof will not be repeated. The scanner driver 1302 includes a scanning control unit 1401, conveyance path determination unit 1402, and priority setting unit 1403. The scanning control unit 1401 controls the overall processing of the scanner driver. When causing the MFP 1 to execute scanning processing based on a scanning instruction received from the application, the conveyance path determination unit 1402 determines whether the original document conveyance path and sheet conveyance path are common. When the conveyance path determination unit 1402 determines that the conveyance paths are common, the priority setting unit 1403 sets the priority of scanning processing.

<Processing in MFP 1 (Case in which Scanning Instruction is Input)>

Figure 15:
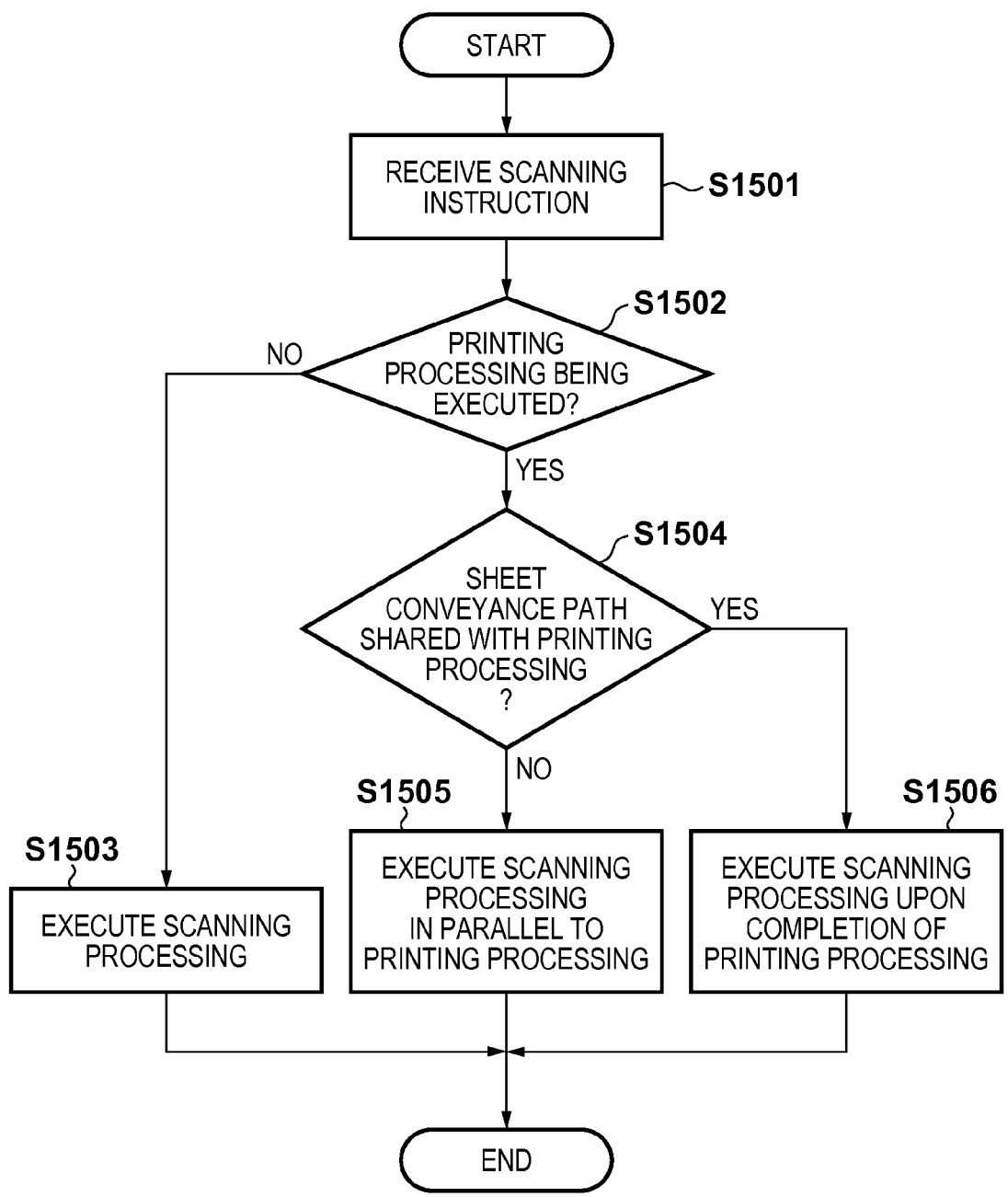
FIG. 15 is a flowchart showing the sequence of processing to be executed by the MFP when a scanning instruction is input according to the first embodiment.

A job execution control sequence to be executed by the MFP 1 when a scanning instruction is input will be described with reference to the flowchart of FIG. 15. Processing shown in FIG. 15 is implemented in the MFP 1 as processes by the respective functional units shown in FIG. 12 when the CPU 801 reads out and executes a program stored in the program memory 803.

In step S1501, the operation instruction reception unit 1205 receives an operation instruction as a processing execution instruction from the host computer 1000. Assume that the operation instruction reception unit 1205 receives a scanning control command which has been transmitted from the scanner driver 1302 and corresponds to a scanning instruction. The scanning instruction corresponds to a scanning processing (reading processing) execution instruction. Note that the operation instruction reception unit 1205 may accept an execution instruction (scanning instruction) as an input via the UI 850.

In step S1502, the operation instruction control unit 1206 determines whether printing processing for the sheet S is being executed in the MFP 1 when the scanning instruction is input. If the operation instruction control unit 1206 determines that printing processing is not being executed, it advances the process to step S1503, and requests the scanning operation control unit 1210 to execute scanning processing based on the scanning instruction. In step S1503, the scanning operation control unit 1210 controls the scanning processing unit 1212 to execute scanning processing for the original document G.

If the operation instruction control unit 1206 determines in step S1502 that printing processing is being executed, it advances the process to step S1504. In step S1504, the operation instruction control unit 1206 further determines whether the conveyance path for the original document G in scanning processing based on the scanning instruction is common to the conveyance path for the sheet S in printing processing in progress. When double-sided printing is being executed for the sheet S, the sheet S is conveyed through the double-sided conveyance path 80 which is also used as the conveyance path for the original document G. For this reason, when double-sided printing is being executed as printing processing, the operation instruction control unit 1206 determines that the conveyance path for the original document G and the conveyance path for the sheet S are common.

If the operation instruction control unit 1206 determines in step S1504 that the conveyance path for the original document G and the conveyance path for the sheet S are not common, it advances the process to step S1505. In step S1505, the operation instruction control unit 1206 requests the scanning operation control unit 1210 to execute scanning processing based on the scanning instruction. The scanning operation control unit 1210 controls the scanning processing unit 1212 to execute scanning processing for the original document G in parallel to printing processing even during execution of the printing processing.

If the operation instruction control unit 1206 determines in step S1504 that the conveyance path for the original document G and the conveyance path for the sheet S are common, it advances the process to step S1506. In step S1506, the operation instruction control unit 1206 requests the scanning operation control unit 1210 to execute scanning processing based on the scanning instruction upon completion of printing processing. In response to this request, the scanning operation control unit 1210 controls the scanning processing unit 1212 to execute scanning processing based on the scanning instruction upon completion of the printing processing.

In step S1506, the operation instruction control unit 1206 may notify the user via, for example, the UI 850 that scanning processing based on the scanning instruction cannot be started till the completion of printing processing in progress. Alternatively, the operation instruction control unit 1206 may notify the user that scanning processing based on the scanning instruction cannot be executed, and delete the scanning instruction.

By the above processing, when the conveyance path for the original document G and the conveyance path for the sheet S may be common during execution of printing processing for the sheet S in the MFP 1, scanning processing for the original document G can be executed without a collision between the original document G and the sheet S on the conveyance path.

As described above, the MFP 1 may receive, from the host computer 1000, not only a scanning instruction based on the network scanning function, but also a scanning instruction based on another function. For example, the MFP 1 may receive a scanning instruction based on a function of scanning and transmitting an original document, such as FAX transmission. Even in this case, the same advantages as those described above can be obtained.

<Processing in MFP 1 (Case in which Printing Instruction is Input)>

Figure 16:
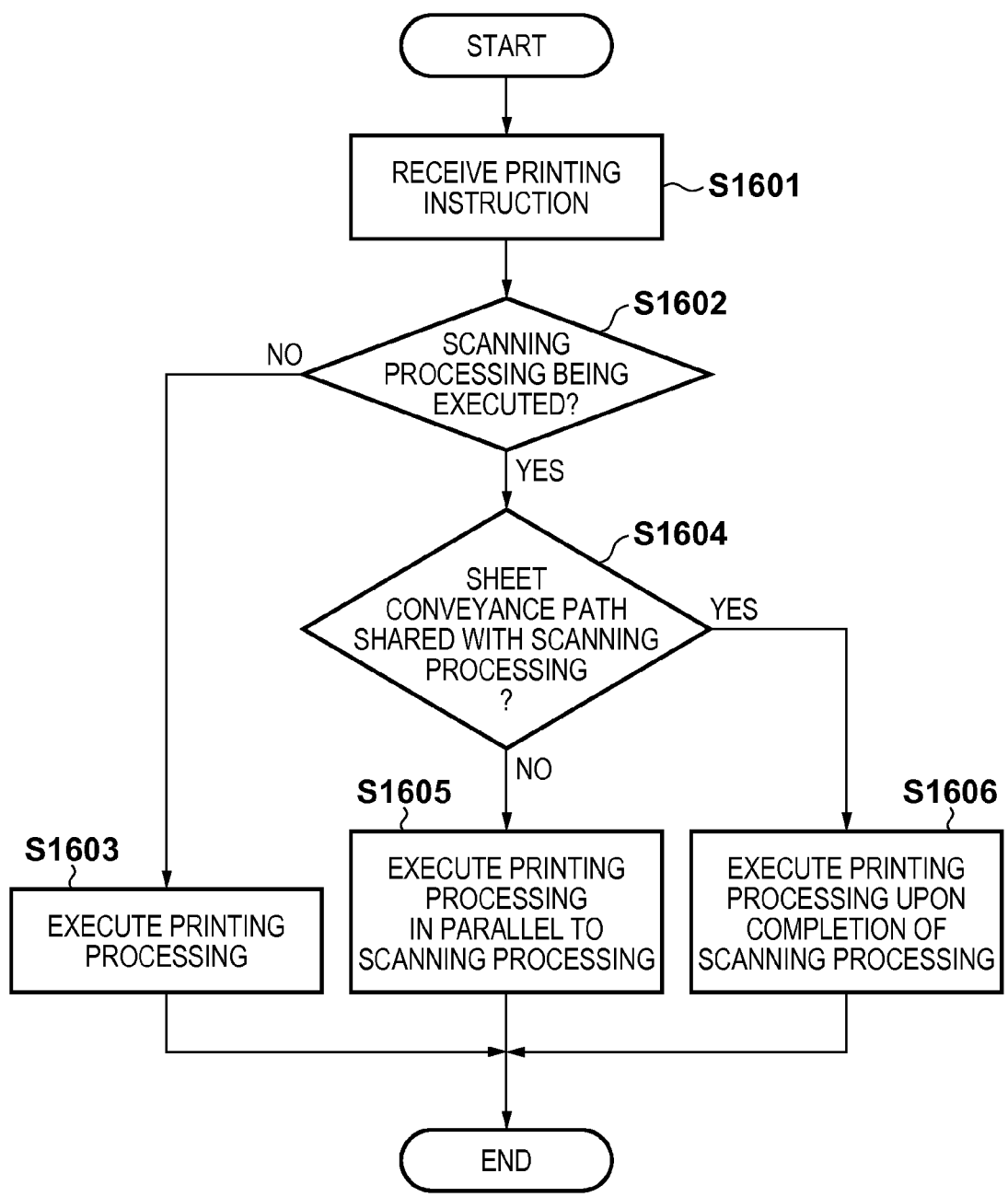
FIG. 16 is a flowchart showing the sequence of processing to be executed by the MFP when a printing instruction is input according to the first embodiment.

A job execution control sequence to be executed by the MFP 1 when a printing instruction is input will be described with reference to the flowchart of FIG. 16. Processing shown in FIG. 16 is implemented in the MFP 1 as processes by the respective functional units shown in FIG. 12 when the CPU 801 reads out and executes a program stored in the program memory 803.

In step S1601, the operation instruction reception unit 1205 receives an operation instruction as a processing execution instruction from the host computer 1000. Assume that the operation instruction reception unit 1205 receives a PDL command which has been transmitted from the host computer 1000 (system spooler 1104) and corresponds to a printing instruction. The printing instruction corresponds to a printing processing execution instruction. Note that the operation instruction reception unit 1205 may accept an execution instruction (printing instruction) as an input via the UI 850.

In step S1602, the operation instruction control unit 1206 determines whether scanning processing for the original document G is being executed in the MFP 1 when the printing instruction is input. If the operation instruction control unit 1206 determines that scanning processing is not being executed, it advances the process to step S1603, and requests the printing operation control unit 1207 to execute printing processing based on the printing instruction. In step S1603, the printing operation control unit 1207 controls the printing processing unit 1209 to execute printing processing for the sheet S.

If the operation instruction control unit 1206 determines in step S1602 that scanning processing is being executed, it advances the process to step S1604. In step S1604, the operation instruction control unit 1206 further determines whether the conveyance path for the sheet S in printing processing based on the printing instruction is common to the conveyance path for the original document G in scanning processing in progress. In this case, if double-sided printing is executed for the sheet S when scanning processing for the original document G is being executed, the sheet S is conveyed through the double-sided conveyance path 80 which is also used as the conveyance path for the original document G. Thus, when the printing instruction contains a double-sided printing execution instruction, the operation instruction control unit 1206 determines that the conveyance path for the original document G and the conveyance path for the sheet S are common.

If the operation instruction control unit 1206 determines in step S1604 that the conveyance path for the original document G and the conveyance path for the sheet S are not common, it advances the process to step S1605. In step S1605, the operation instruction control unit 1206 requests the printing operation control unit 1207 to execute printing processing based on the printing instruction. The printing operation control unit 1207 controls the printing processing unit 1209 to execute printing processing for the sheet S in parallel to scanning processing even during execution of the scanning processing.

If the operation instruction control unit 1206 determines in step S1604 that the conveyance path for the original document G and the conveyance path for the sheet S are common, it advances the process to step S1606. In step S1606, the operation instruction control unit 1206 requests the printing operation control unit 1207 to execute printing processing based on the printing instruction upon completion of scanning processing. In response to this request, the printing operation control unit 1207 controls the printing processing unit 1209 to execute printing processing based on the printing instruction upon completion of the scanning processing.

In step S1606, the operation instruction control unit 1206 may notify the user via, for example, the UI 850 that printing processing based on the printing instruction cannot be started till the completion of scanning processing in progress. Alternatively, the operation instruction control unit 1206 may notify the user that printing processing based on the printing instruction cannot be executed, and delete the printing instruction.

By the above processing, when the conveyance path for the original document G and the conveyance path for the sheet S may be common during execution of scanning processing for the original document G in the MFP 1, printing processing for the sheet S can be executed without a collision between the original document G and the sheet S on the conveyance path.

Second Embodiment

The second embodiment will explain a case in which a host computer 1000 can designate, in a printing instruction, to preferentially execute printing processing out of printing processing and scanning processing.

<Processing in Host Computer 1000>

Figure 17:
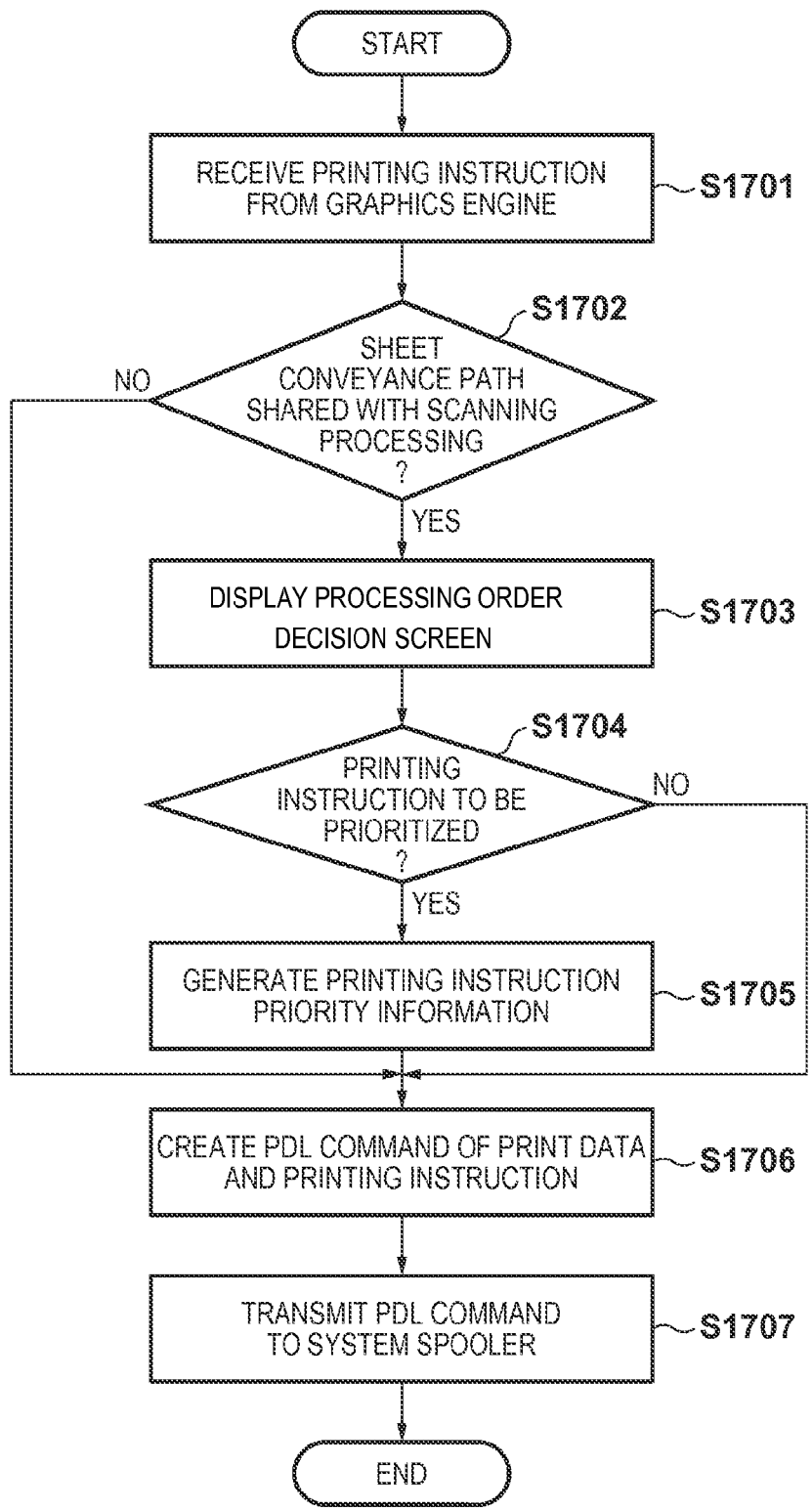
FIG. 17 is a flowchart showing the sequence of processing to be executed by a printer driver in a host computer according to the second embodiment.

Priority setting pertaining to a printing instruction, which is executed by a printer driver 1103 in the host computer 1000, will be described with reference to the flowchart of FIG. 17. Note that the program of the printer driver 1103 is stored in an external memory (HD) 1011 of the host computer 1000, read out to a RAM 1002, and executed by a CPU 1001.

First, when instructing execution of printing processing for a document, an application 1101 invokes the printer driver 1103 via a graphics engine 1102. In step S1701, a printing control unit 1201 receives, from the graphics engine 1102, print data of a document and a printing instruction corresponding to a printing processing execution instruction.

In step S1702, a conveyance path determination unit 1202 determines, based on the received print data and printing instruction, whether the conveyance path for a sheet S to be used in printing processing in an MFP 1 may be common to the conveyance path for an original document G to be used in scanning processing. In the embodiment, a double-sided conveyance path 80 is shared between the conveyance path for the sheet S and the conveyance path for the original document G in execution of double-sided printing. Hence, the conveyance path determination unit 1202 determines whether the printing instruction contains a double-sided printing setting. If the conveyance path determination unit 1202 determines that the conveyance paths may be common, it advances the process to step S1703; if NO, to step S1706.

In step S1703, a priority setting unit 1203 displays, on a display 1010, a screen 1801 (FIG. 18) for setting whether to occupy the double-sided conveyance path 80 of the MFP 1 and execute printing processing (whether to give higher priority to printing processing than scanning processing). On the screen (FIG. 18), an explanation 1802 to the user, a button 1803 to prioritize printing processing, and a button 1804 not to particularly prioritize printing processing are arranged.

If the priority setting unit 1203 detects in step S1704 that the user has pressed the button 1803 to prioritize printing processing, it advances the process to step S1705, generates information representing that printing processing is prioritized, and adds the information to the printing instruction. Then, the priority setting unit 1203 advances the process to step S1706. If the priority setting unit 1203 detects that the user has pressed the button 1804 not to particularly prioritize printing processing, it advances the process to step S1706.

In step S1706, the printing control unit 1201 converts the print data of the document and the printing instruction received in step S1701 into a printing command in the page description language (PDL). After that, in step S1707, a printing processing unit 1204 transmits the PDL command generated in step S1706 to a system spooler 1104, thereby transmitting the PDL command to the MFP 1.

<Processing in MFP 1>

Figure 19:
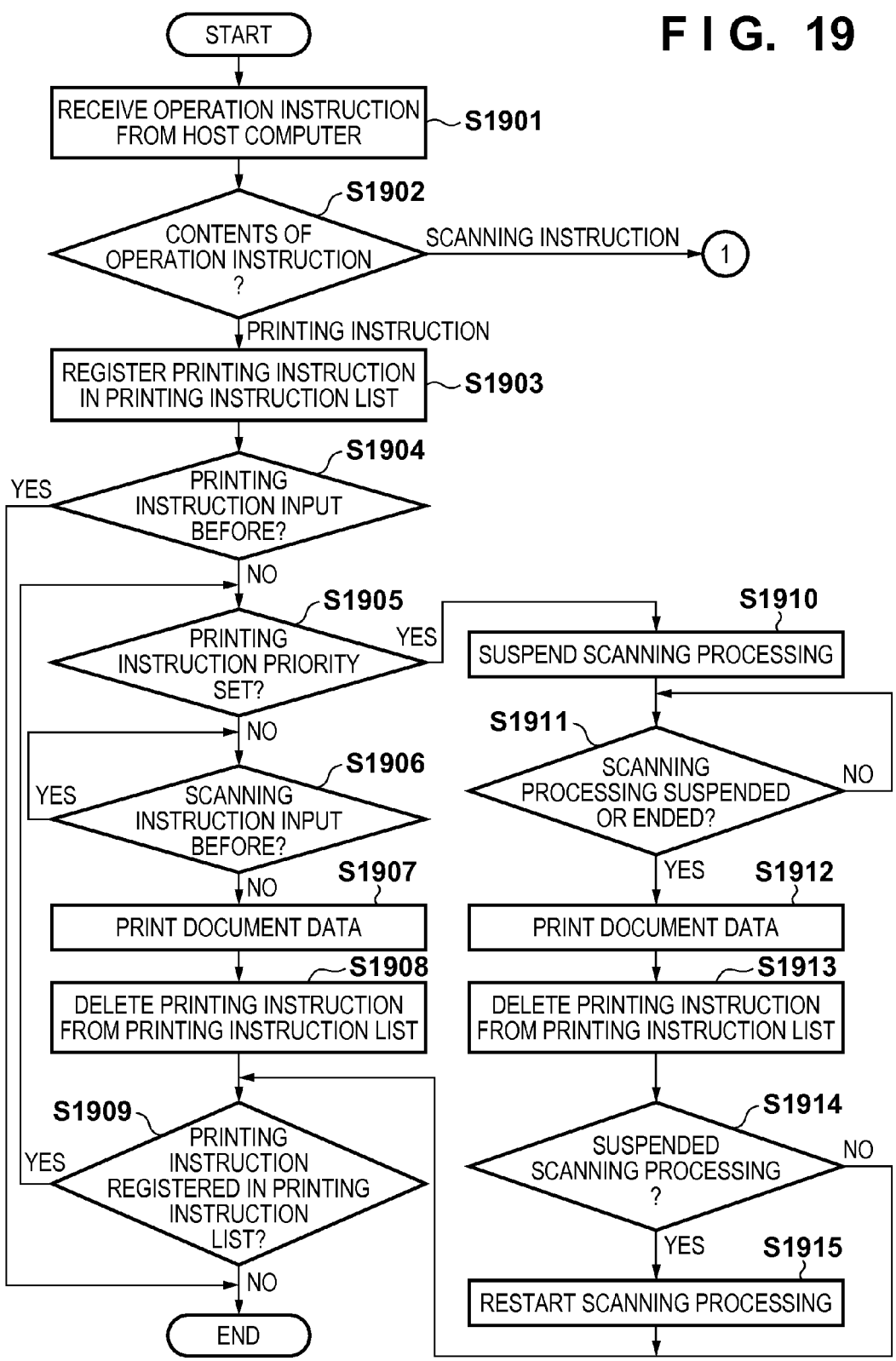
FIG. 19 is a flowchart showing the sequence of processing to be executed by an MFP according to the second embodiment.

Next, a job execution control sequence to be executed by the MFP 1 will be described with reference to the flowchart of FIG. 19. Processing shown in FIG. 19 is implemented in the MFP 1 as processes by respective functional units shown in FIG. 12 when a CPU 801 reads out and executes a program stored in a program memory 803.

Figure 20:
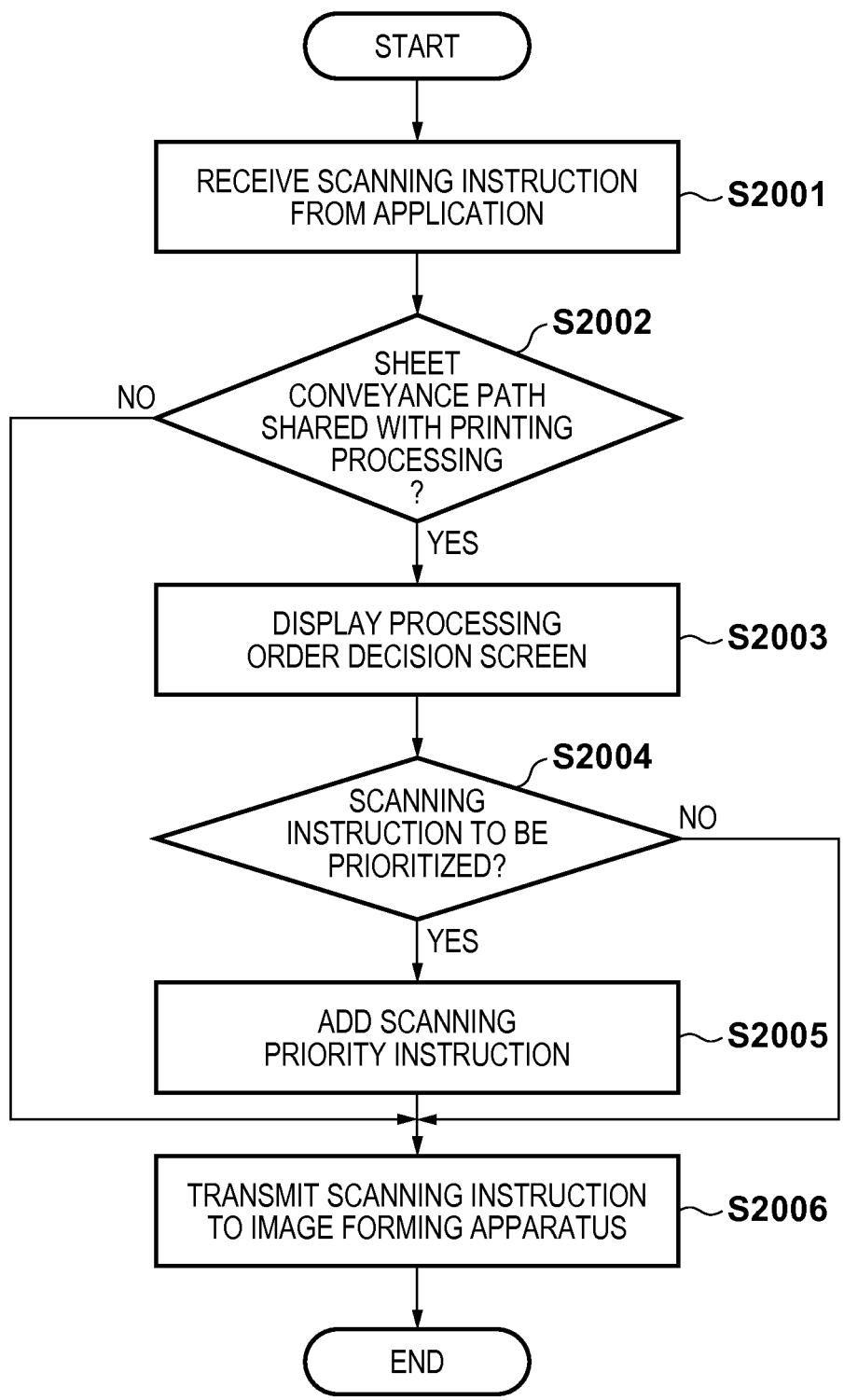
FIG. 20 is a flowchart showing the sequence of processing to be executed by a scanner driver in a host computer according to the third embodiment.

In step S1901, an operation instruction reception unit 1205 receives an operation instruction from the host computer 1000. (Assume that the operation instruction reception unit 1205 receives a PDL command which has been transmitted from the system spooler 1104 and corresponds to a printing instruction.) In step S1902, an operation instruction control unit 1206 determines which of a printing instruction and scanning instruction is the received operation instruction. If the received operation instruction is a printing instruction, the operation instruction control unit 1206 advances the process to step S1903; if it is a scanning instruction, to step S2001 (FIG. 20). (Note that the case in which the received operation instruction is a scanning instruction will be described as the third embodiment.)

In step S1903, the operation instruction control unit 1206 registers the received PDL command in a printing instruction list 1208 managed by a printing operation control unit 1207. In step S1904, the operation instruction control unit 1206 determines, based on the printing instruction list 1208 managed by the printing operation control unit 1207, whether there is a printing instruction which has been input before. If there is an instruction input before, the operation instruction control unit 1206 ends the process; if there is no printing instruction input before, advances the process to step S1905.

In step S1905, the printing operation control unit 1207 determines whether it is set in the PDL command to prioritize a printing instruction. If this is not set, the printing operation control unit 1207 advances the process to step S1906; if this is set, to step S1910.

(Case in which Printing Instruction is not Prioritized)

In step S1906, the printing operation control unit 1207 inquires of the operation instruction control unit 1206 whether there is a scanning instruction which has been input prior to the printing instruction whose processing is to start. Based on a scanning instruction list 1211 managed by a scanning operation control unit 1210, the operation instruction control unit 1206 determines whether there is a scanning instruction input before. If the operation instruction control unit 1206 determines that there is a scanning instruction input before, it interrupts printing processing corresponding to the printing instruction till the completion of scanning processing corresponding to the instruction. If the operation instruction control unit 1206 determines that there is no scanning instruction input before or that scanning processing corresponding to the scanning instruction input before has ended, it advances the process to step S1907.

In step S1907, the printing operation control unit 1207 transfers the PDL command to a printing processing unit 1209, and controls the printing processing unit 1209 to execute printing processing complying with the PDL command. After the end of printing, in step S1908, the printing operation control unit 1207 deletes the corresponding printing instruction registered in the printing instruction list 1208, and then advances the process to step S1909.

(Case in which Printing Instruction is Prioritized)

In step S1910, the printing operation control unit 1207 requests the operation instruction control unit 1206 to interrupt scanning processing in progress. In accordance with this instruction, the operation instruction control unit 1206 instructs the scanning operation control unit 1210 to interrupt the scanning processing. In step S1911, the printing operation control unit 1207 waits until it receives, from the operation instruction control unit 1206, a response representing that the scanning processing has been suspended or has ended.

If the printing operation control unit 1207 receives the response from the operation instruction control unit 1206, it advances the process to step S1912, transfers the PDL command to the printing processing unit 1209, and controls the printing processing unit 1209 to execute printing processing complying with the PDL command. After the end of the printing processing, in step S1913, the printing operation control unit 1207 deletes the corresponding printing instruction registered in the printing instruction list 1208.

In step S1914, the operation instruction control unit 1206 determines whether there is scanning processing which has been suspended in step S1910. In step S1915, the operation instruction control unit 1206 instructs the scanning operation control unit 1210 to restart the scanning processing, as needed, and then advances the process to step S1909.

Finally, in step S1909, the printing operation control unit 1207 determines whether the next printing instruction has been registered in the printing instruction list 1208. If the next printing instruction has been registered, the printing operation control unit 1207 returns the process to step S1905 to start execution of processing corresponding to the registered printing instruction. If no next printing instruction has been registered, the printing operation control unit 1207 ends the process.

As described above, according to the second embodiment, a printing instruction to be transmitted from the host computer 1000 to the MFP 1 can designate to prioritize printing processing based on the printing instruction. In the case of this designation, if the conveyance path for the original document G and the conveyance path for the sheet S may be common when a printing instruction is input (received), the MFP 1 suspends even scanning processing in progress and executes printing processing. Hence, when the conveyance path for the original document G and the conveyance path for the sheet S may be common during execution of scanning processing for the original document G in the MFP 1, printing processing for the sheet S can be executed without a collision between the original document G and the sheet S on the conveyance path. This can improve user friendliness.

Third Embodiment

The third embodiment will explain a case in which a host computer 1000 can designate, in a scanning instruction, to preferentially execute scanning processing out of printing processing and scanning processing.

<Processing in Host Computer 1000>

Priority setting pertaining to a scanning instruction, which is executed by a scanner driver 1302 in the host computer 1000, will be described with reference to the flowchart of FIG. 20. Note that the program of the scanner driver 1302 is stored in an external memory (HD) 1011 of the host computer 1000, read out to a RAM 1002, and executed by a CPU 1001.

First, when instructing execution of reading (scanning) processing for an original document G set in a second sheet feeding unit 90 of an MFP 1, an application 1301 invokes the scanner driver 1302. In step S2001, a scanning control unit 1401 of the scanner driver 1302 receives, from the application 1301, a scanning instruction corresponding to a scanning processing execution instruction.

In step S2002, a conveyance path determination unit 1402 determines, based on the received scanning instruction, whether the conveyance path for the original document G to be used in scanning processing in the MFP 1 may be common to the conveyance path for a sheet S to be used in printing processing. In the embodiment, a double-sided conveyance path 80 is shared between the conveyance path for the sheet S and the conveyance path for the original document G in execution of double-sided printing. Depending on the execution status of printing processing, the same conveyance path may be used as the conveyance path for the original document G and the conveyance path for the sheet S. If the conveyance path determination unit 1402 determines that the conveyance paths may be at least common, it advances the process to step S2003; if NO, to step S2006.

Figure 21:
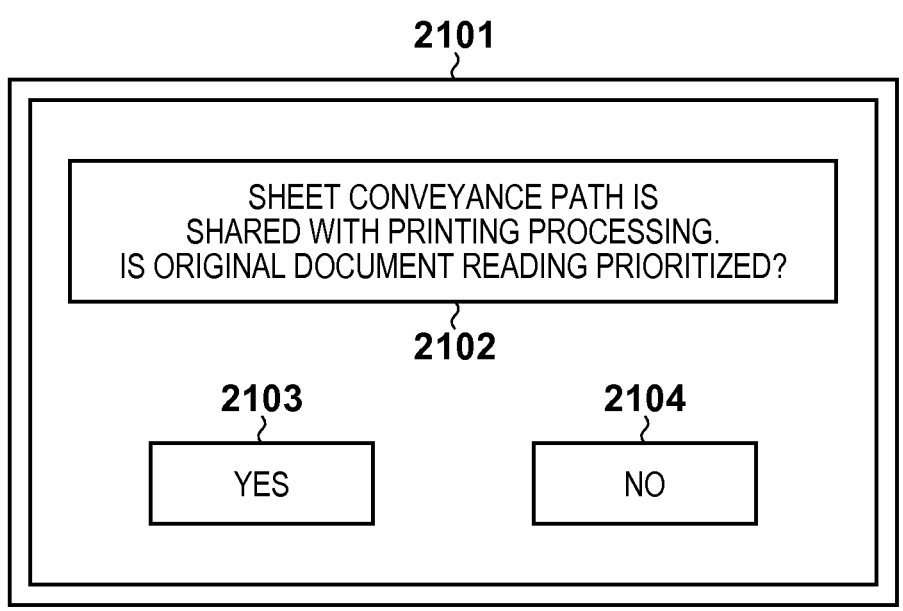
FIG. 21 is a view exemplifying a scanning priority setting screen according to the third embodiment.

In step S2003, a priority setting unit 1403 displays, on a display 1010, a screen 2101 (FIG. 21) for setting whether to occupy the double-sided conveyance path 80 of the MFP 1 and execute scanning processing (whether to give higher priority to scanning processing than printing processing). On the screen (FIG. 21), an explanation 2102 to the user, a button 2103 to prioritize scanning processing, and a button 2104 not to particularly prioritize scanning processing are arranged.

If the priority setting unit 1403 detects in step S2004 that the user has pressed the button 2103 to prioritize scanning processing, it advances the process to step S2005, generates information representing that scanning processing is prioritized, and adds the information to the scanning instruction. Then, the priority setting unit 1403 advances the process to step S2006. If the priority setting unit 1403 detects in step S2004 that the user has pressed the button 2104 not to particularly prioritize scanning processing, it advances the process to step S2006.

In step S2006, the scanning control unit 1401 transmits the scanning instruction received in step S2001 as a scanning control command to the MFP 1.

<Processing in MFP 1>

Figure 22:
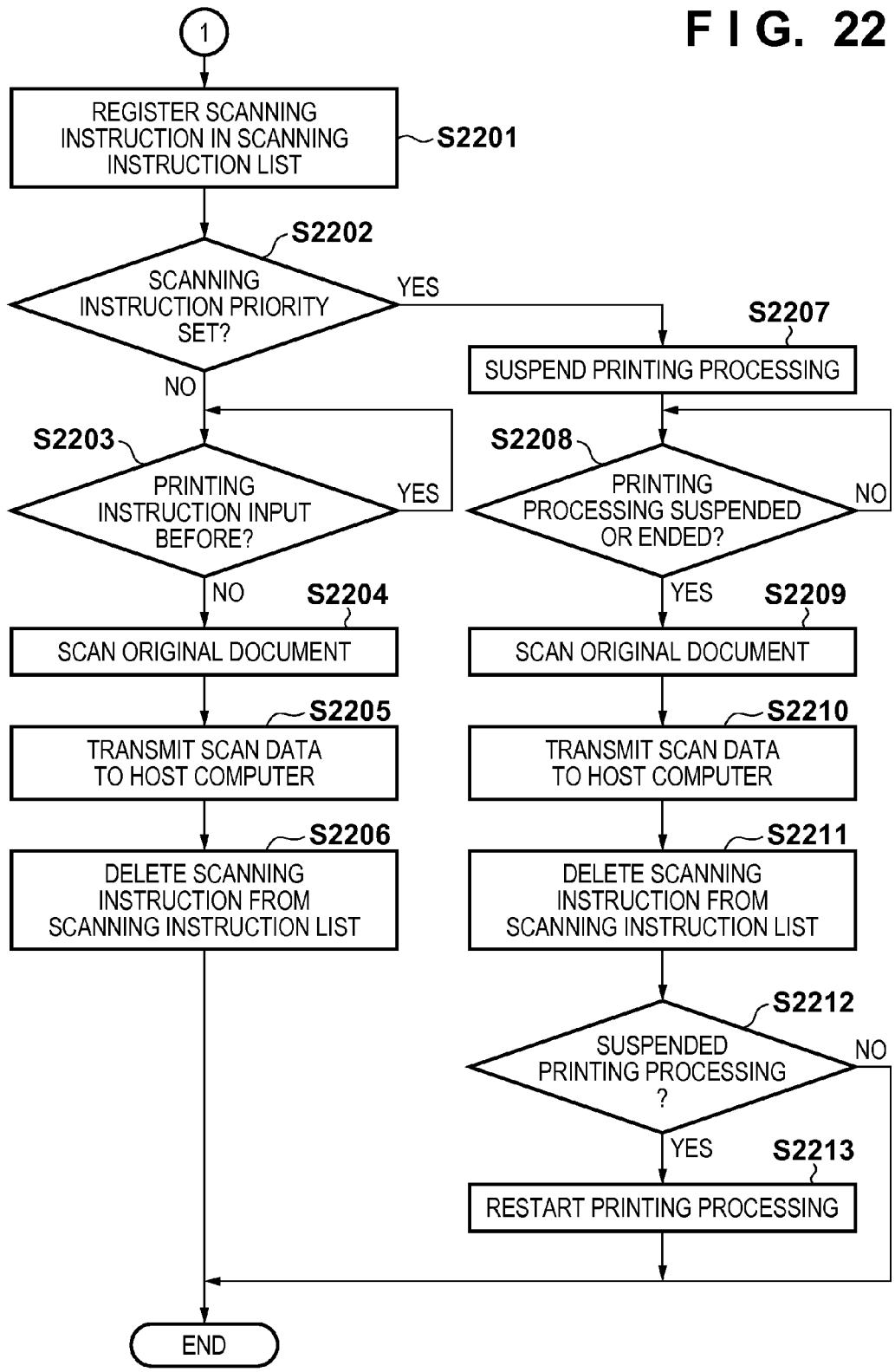
FIG. 22 is a flowchart showing the sequence of processing to be executed by an MFP according to the third embodiment.

Next, a job execution control sequence to be executed by the MFP 1 will be described with reference to the flowcharts of FIGS. 19 and 22. Processing shown in FIGS. 19 and 22 is implemented in the MFP 1 as processes by respective functional units shown in FIG. 12 when a CPU 801 reads out and executes a program stored in a program memory 803. Note that the above-described second embodiment corresponds to a case in which the process advances from step S1902 to step S1903, and the third embodiment corresponds to a case in which the process advances from step S1902 to step S2201 (FIG. 22).

In step S1901, an operation instruction reception unit 1205 receives an operation instruction from the host computer 1000. (Assume that the operation instruction reception unit 1205 receives a scanning control command which has been transmitted from the scanner driver 1302 and corresponds to a scanning instruction.) In step S1902, an operation instruction control unit 1206 determines which of a printing instruction and scanning instruction is the received operation instruction. If the received operation instruction is a printing instruction, the operation instruction control unit 1206 advances the process to step S1903; if it is a scanning instruction, to step S2201 (FIG. 22). (Note that the case in which the received operation instruction is a printing instruction has already been described as the second embodiment.)

In step S2201, the operation instruction control unit 1206 registers the received scanning control command in a scanning instruction list 1211 managed by a scanning operation control unit 1210. In step S2202, the scanning operation control unit 1210 determines whether it is set in the scanning control command to prioritize a scanning instruction. If this is not set, the scanning operation control unit 1210 advances the process to step S2203; if this is set, to step S2207.

(Case in which Scanning Instruction is not Prioritized)

In step S2203, the scanning operation control unit 1210 inquires of the operation instruction control unit 1206 whether there is a printing instruction which has been input prior to the scanning instruction whose processing is to start. If the operation instruction control unit 1206 determines, based on a printing instruction list 1208 managed by a printing operation control unit 1207, that there is a printing instruction input before, it interrupts scanning processing corresponding to the scanning instruction till the completion of printing processing corresponding to the instruction. If the operation instruction control unit 1206 determines that there is no printing instruction input before or that printing processing corresponding to the printing instruction input before has ended, it advances the process to step S2204.

In step S2204, the scanning operation control unit 1210 transfers the scanning control command to a scanning processing unit 1212, and controls the scanning processing unit 1212 to execute scanning processing complying with the scanning control command. After the end of the scanning processing, in step S2205, the scanning operation control unit 1210 transmits scan data obtained by the scanning processing to the scanner driver 1302 (host computer 1000). After the end of the scanning processing and scan data transmission for all original documents, in step S2206, the scanning operation control unit 1210 deletes the corresponding scanning instruction registered in the scanning instruction list 1211.

(Case in which Scanning Instruction is Prioritized)

In step S2207, the scanning operation control unit 1210 requests the operation instruction control unit 1206 to interrupt printing processing in progress. In accordance with this instruction, the operation instruction control unit 1206 instructs the printing operation control unit 1207 to interrupt the printing processing. In step S2208, the scanning operation control unit 1210 waits until it receives, from the operation instruction control unit 1206, a response representing that the printing processing has been suspended or has ended.

If the scanning operation control unit 1210 receives the response from the operation instruction control unit 1206, it advances the process to step S2209, and transfers the scanning control command to the scanning processing unit 1212. Then, the scanning operation control unit 1210 controls the scanning processing unit 1212 to execute scanning processing complying with the scanning control command. After the end of the scanning processing, in step S2210, the scanning operation control unit 1210 transmits the obtained scan data to the scanner driver 1302 (host computer 1000). After the end of the scanning processing and scan data transmission for all original documents, in step S2211, the scanning operation control unit 1210 deletes the corresponding scanning instruction registered in the scanning instruction list 1211.

In step S2212, the operation instruction control unit 1206 determines whether there is printing processing which has been suspended in step S2207. In step S2213, the operation instruction control unit 1206 instructs the printing operation control unit 1207 to restart the printing processing, as needed, and then ends the process.

As described above, according to the third embodiment, a scanning instruction to be transmitted from the host computer 1000 to the MFP 1 can designate to prioritize scanning processing based on the scanning instruction. In the case of this designation, if the conveyance path for the original document G and the conveyance path for the sheet S may be common when a scanning instruction is input (received), the MFP 1 suspends even printing processing in progress and executes scanning processing. Therefore, when the conveyance path for the original document G and the conveyance path for the sheet S may be common during execution of printing processing for the sheet S in the MFP 1, scanning processing for the original document G can be executed without a collision between the original document G and the sheet S on the conveyance path. This can improve user friendliness.

Fourth Embodiment

The second and third embodiments have described a case in which an instruction (printing instruction or scanning instruction) received from the host computer 1000 contains information representing that processing corresponding to the instruction is prioritized (a conveyance path for a sheet or original document to be used in this processing is preferentially used). That is, the second and third embodiments have described a case in which an instruction received from the host computer 1000 contains designation of processing to be prioritized. The fourth embodiment will explain a case in which, which of printing processing and scanning processing should be prioritized is not designated from a host computer 1000, but is set in an MFP 1 in advance.

<Setting of Use Priority in MFP 1>

Figure 23:
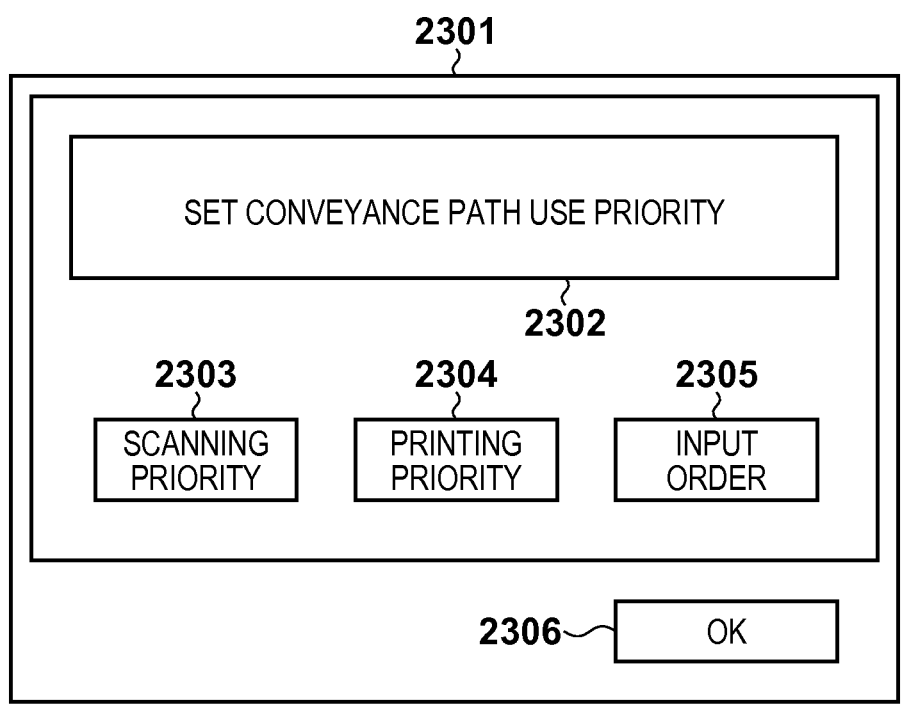
FIG. 23 is a view exemplifying a screen for setting a conveyance path use priority according to the fourth embodiment.

FIG. 23 exemplifies a setting screen which is displayed on an operation panel when the MFP 1 accepts, from the user via an operation panel (UI 850), a priority setting request pertaining to the use of the sheet conveyance path. On a setting screen 2301, an explanation 2302 to the user, buttons 2303 to 2305 to select a conveyance path use priority, and an OK button 2306 to settle the setting are arranged.

The scanning priority button 2303 is a button for setting a conveyance path shared between an original document and a sheet to use it preferentially for scanning processing. The printing priority button 2304 is a button for setting the conveyance path shared between an original document and a sheet to use it preferentially for printing processing. The input order button 2305 is a button for setting the conveyance path shared between an original document and a sheet to use it in accordance with the input order of a scanning instruction and printing instruction. If the MFP 1 detects that the user has selected one of the buttons 2303 to 2305 via the operation panel (UI 850) and pressed the OK button 2306, it notifies an operation instruction control unit 1206 of the setting content. In accordance with the setting content, the operation instruction control unit 1206 decides the processing order of a scanning instruction and printing instruction.

<Processing in MFP 1 (for Printing Instruction)>

Figure 24A:
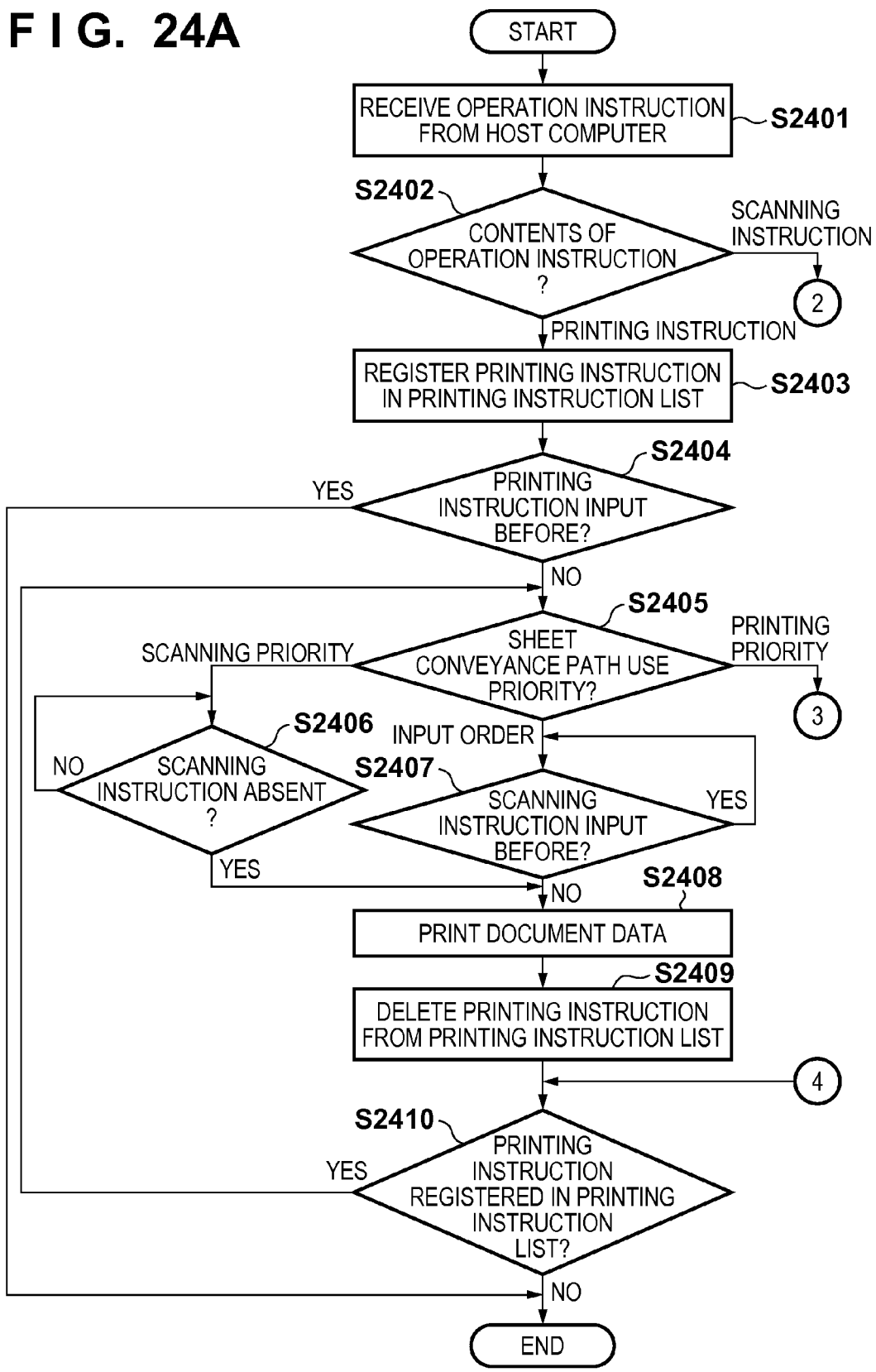
FIGS. 24A and 24B are flowcharts showing the sequence of processing to be executed by an MFP according to the fourth embodiment.
Figure 24B:
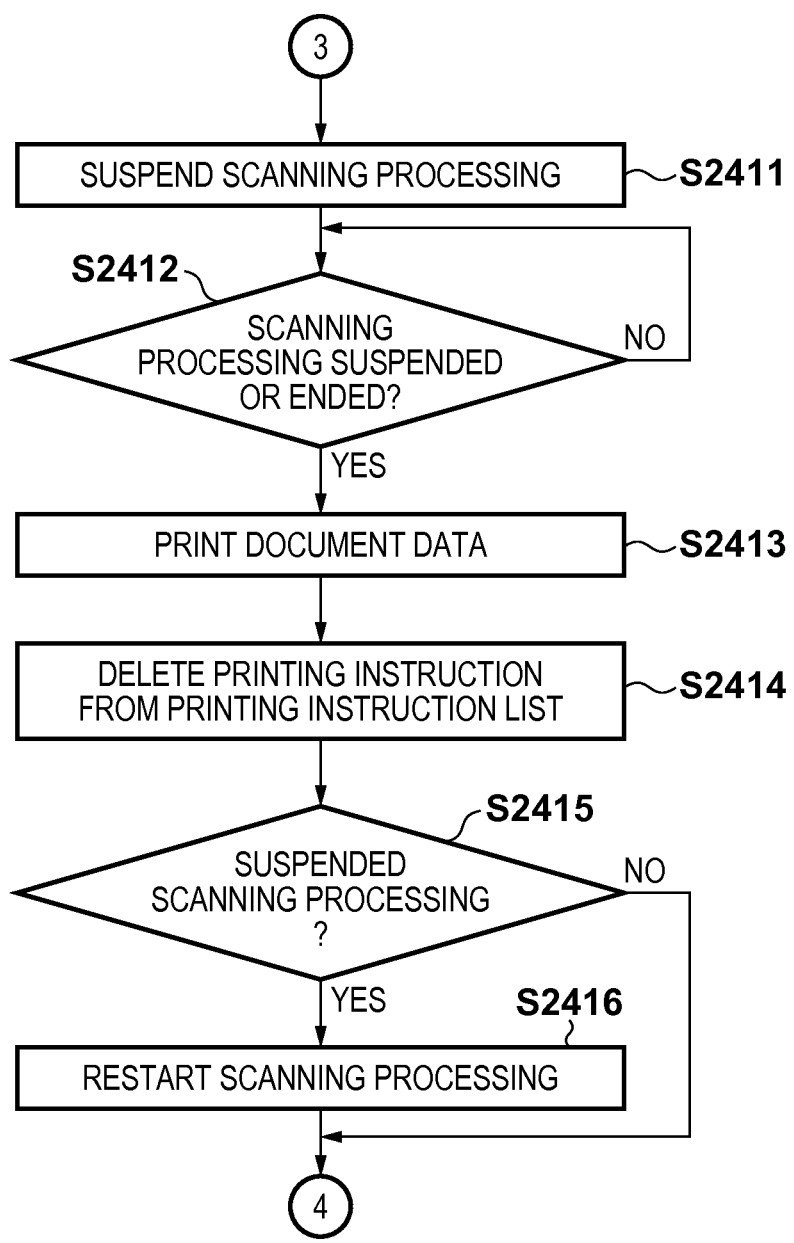

A job execution control sequence to be executed by the MFP 1 will be described with reference to FIGS. 24A and 24B. Processing shown in FIGS. 24A and 24B is implemented in the MFP 1 as processes by respective functional units shown in FIG. 12 when a CPU 801 reads out and executes a program stored in a program memory 803.

Figure 25:
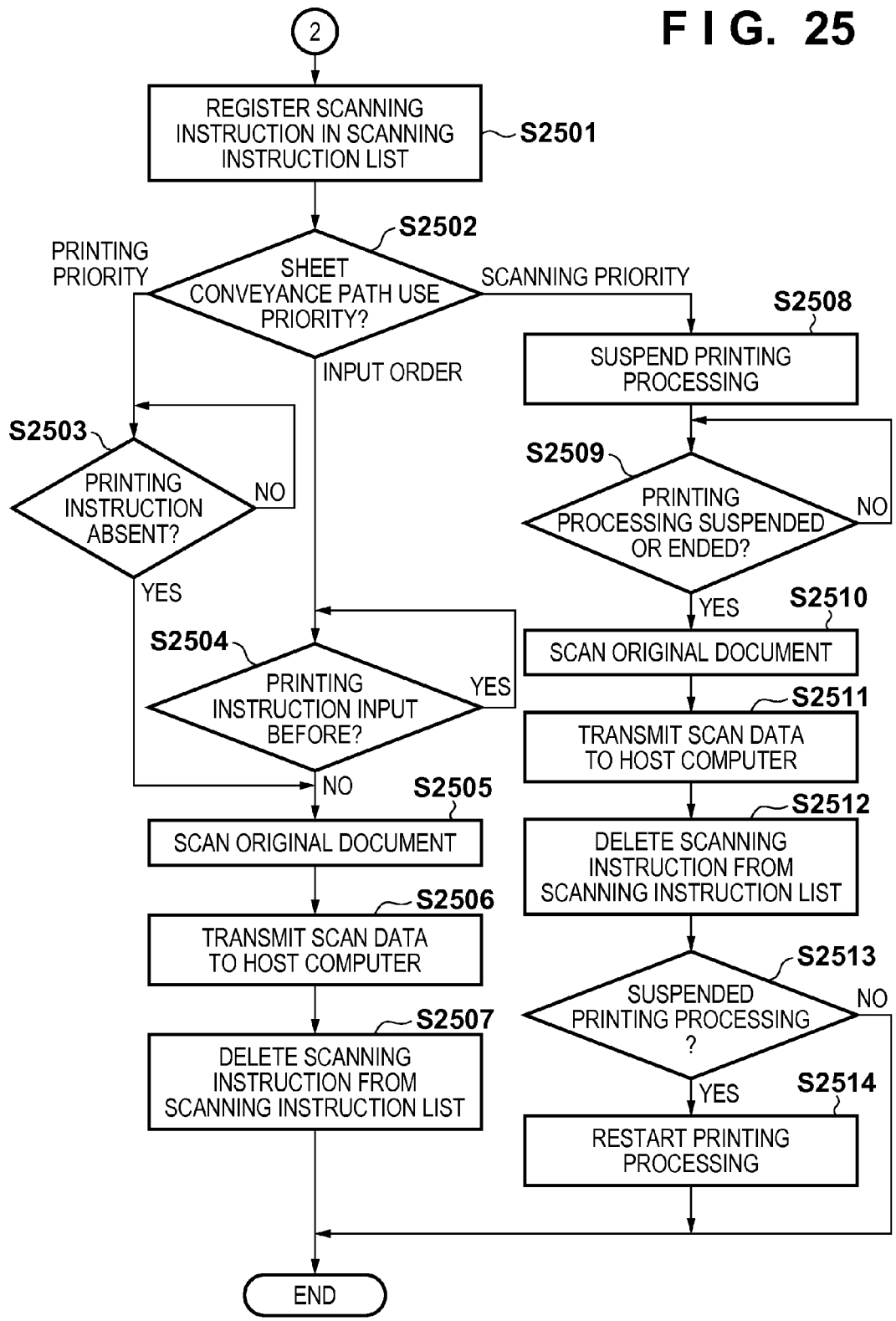
FIG. 25 is a flowchart showing the sequence of processing to be executed by the MFP according to the fourth embodiment.

In step S2401, an operation instruction reception unit 1205 receives an operation instruction from the host computer 1000. Assume that the operation instruction reception unit 1205 receives a PDL command which has been transmitted from a system spooler 1104 (host computer 1000) and corresponds to a printing instruction, similar to the second embodiment. In the fourth embodiment, unlike the second embodiment, printing instruction priority information is not added to the received PDL command. In step S2402, the operation instruction control unit 1206 determines which of a printing instruction and scanning instruction is the received operation instruction. If the received operation instruction is a printing instruction, the operation instruction control unit 1206 advances the process to step S2403; if it is a scanning instruction, to step S2501 (FIG. 25). (Note that the case in which the received operation instruction is a scanning instruction will be described later.)

In step S2403, the operation instruction control unit 1206 registers the received PDL command in a printing instruction list 1208 managed by a printing operation control unit 1207. In step S2404, the operation instruction control unit 1206 determines, based on the printing instruction list 1208 managed by the printing operation control unit 1207, whether there is a printing instruction which has been input before. If there is a printing instruction input before, the operation instruction control unit 1206 ends the process; if there is no printing instruction input before, advances the process to step S2405. In step S2405, the printing operation control unit 1207 inquires, of the operation instruction control unit 1206, the use priority of the conveyance path shared between an original document and a sheet, and determines whether the printing instruction can be executed.

(Case of "Scanning Priority")

If the conveyance path use priority is set to "scanning priority" in step S2405, the printing operation control unit 1207 advances the process to step S2406. In step S2406, the printing operation control unit 1207 inquires of the operation instruction control unit 1206 whether there is a scanning instruction which has been input prior to the printing instruction. The operation instruction control unit 1206 makes a determination based on a scanning instruction list 1211 managed by a scanning operation control unit 1210. If there is a scanning instruction input before, the operation instruction control unit 1206 controls the printing operation control unit 1207 to interrupt printing processing corresponding to the printing instruction till the completion of scanning processing corresponding to the scanning instruction. If there is no scanning instruction input before or if all scanning processes have been completed and a scanning instruction waiting for processing does not remain in the scanning instruction list 1211, the operation instruction control unit 1206 advances the process to step S2408. Then, the operation instruction control unit 1206 controls the printing operation control unit 1207 to execute (restart) printing processing.

(Case of "Input Order")

If the conveyance path use priority is set to "input order" in step S2405, the printing operation control unit 1207 advances the process to step S2407. In step S2407, the printing operation control unit 1207 inquires of the operation instruction control unit 1206 whether there is a scanning instruction which has been input prior to the printing instruction. The operation instruction control unit 1206 makes a determination based on the scanning instruction list 1211 managed by the scanning operation control unit 1210. If there is a scanning instruction input before, the operation instruction control unit 1206 controls the printing operation control unit 1207 to interrupt printing processing corresponding to the printing instruction till the completion of scanning processing corresponding to the scanning instruction. If there is no scanning instruction input before or scanning processing corresponding to the scanning instruction input before has ended, the operation instruction control unit 1206 advances the process to step S2408. Then, the operation instruction control unit 1206 controls the printing operation control unit 1207 to execute (restart) printing processing.

If the process advances from step S2406 or S2407 to step S2408, the printing operation control unit 1207 transfers the PDL command to a printing processing unit 1209, and controls the printing processing unit 1209 to execute printing processing complying with the PDL command in step S2408. After the end of the printing processing, in step S2409, the printing operation control unit 1207 deletes the corresponding printing instruction registered in the printing instruction list 1208, and then advances the process to step S2410.

(Case of "Printing Priority")

If the conveyance path use priority is set to "printing priority" in step S2405, the printing operation control unit 1207 advances the process to step S2411. In step S2411, the printing operation control unit 1207 requests the operation instruction control unit 1206 to interrupt scanning processing in progress. In accordance with this instruction, the operation instruction control unit 1206 instructs the scanning operation control unit 1210 to interrupt the scanning processing. In step S2412, the printing operation control unit 1207 waits until it receives, from the operation instruction control unit 1206, a response representing that the scanning processing has been suspended or has ended.

If the printing operation control unit 1207 receives the response from the operation instruction control unit 1206, it advances the process to step S2413, transfers the PDL command to the printing processing unit 1209, and controls the printing processing unit 1209 to execute printing processing complying with the PDL command. After the end of the printing processing, in step S2414, the printing operation control unit 1207 deletes the corresponding printing instruction registered in the printing instruction list 1208.

In step S2415, the operation instruction control unit 1206 determines whether there is scanning processing which has been suspended in step S2411. In step S2416, the operation instruction control unit 1206 instructs the scanning operation control unit 1210 to restart the scanning processing, as needed, and then advances the process to step S2410.

Finally, in step S2410, the printing operation control unit 1207 determines whether the next printing instruction has been registered in the printing instruction list 1208. If the next printing instruction has been registered, the printing operation control unit 1207 returns the process to step S2405 to start execution of processing corresponding to the registered printing instruction. If no next printing instruction has been registered, the printing operation control unit 1207 ends the process.

<Processing in MFP 1 (for Scanning Instruction)>

A case in which the operation instruction reception unit 1205 receives, in step S2401 (FIG. 24A), a scanning control command that has been transmitted from the host computer 1000 and corresponds to a scanning instruction, similar to the third embodiment, will be described with reference to FIG. 25. In the fourth embodiment, unlike the third embodiment, printing instruction priority information is not added to the received scanning control command. Processing shown in FIG. 25 is implemented in the MFP 1 as processes by the respective functional units shown in FIG. 12 when the CPU 801 reads out and executes a program stored in the program memory 803.

In step S2402, the operation instruction control unit 1206 determines which of a printing instruction and scanning instruction is the received operation instruction. If the received operation instruction is a scanning instruction, the operation instruction control unit 1206 advances the process to step S2501. In step S2501, the operation instruction control unit 1206 registers the received scanning control command in the scanning instruction list 1211 managed by the scanning operation control unit 1210. In step S2502, the scanning operation control unit 1210 inquires, of the operation instruction control unit 1206, the use priority of the conveyance path shared between an original document and a sheet, and determines whether the scanning instruction can be executed.

(Case of "Printing Priority")

If the conveyance path use priority is set to "printing priority" in step S2502, the scanning operation control unit 1210 advances the process to step S2503. In step S2503, the scanning operation control unit 1210 inquires of the operation instruction control unit 1206 whether there is a printing instruction which has been input prior to the scanning instruction. The operation instruction control unit 1206 makes a determination based on the printing instruction list 1208 managed by the printing operation control unit 1207. If there is a printing instruction input before, the operation instruction control unit 1206 controls the scanning operation control unit 1210 to interrupt scanning processing corresponding to the scanning instruction till the completion of printing processing corresponding to the printing instruction. If there is no printing instruction input before or if all printing processes have been completed and a printing instruction waiting for processing does not remain in the printing instruction list 1208, the operation instruction control unit 1206 advances the process to step S2505.

(Case of "Input Order")

If the conveyance path use priority is set to "input order" in step S2502, the scanning operation control unit 1210 advances the process to step S2504. In step S2504, the scanning operation control unit 1210 inquires of the operation instruction control unit 1206 whether there is a printing instruction which has been input prior to the scanning instruction. The operation instruction control unit 1206 makes a determination based on the printing instruction list 1208 managed by the printing operation control unit 1207. If there is a printing instruction input before, the operation instruction control unit 1206 controls the scanning operation control unit 1210 to interrupt scanning processing corresponding to the scanning instruction till the completion of printing processing corresponding to the printing instruction. If there is no printing instruction input before or printing processing corresponding to the printing instruction input before has ended, the operation instruction control unit 1206 advances the process to step S2505.

If the process advances from step S2503 or S2504 to step S2505, the scanning operation control unit 1210 transfers the scanning control command to a scanning processing unit 1212 in step S2505. Then, the scanning operation control unit 1210 controls the scanning processing unit 1212 to execute scanning processing complying with the scanning control command. After the end of the scanning processing, in step S2506, the scanning operation control unit 1210 transmits the obtained scan data to a scanner driver 1302 (host computer 1000). After the end of the scanning processing and scan data transmission for all original documents, in step S2507, the scanning operation control unit 1210 deletes the corresponding scanning instruction registered in the scanning instruction list 1211, and ends the process.

(Case of "Scanning Priority")

If the conveyance path use priority is set to "scanning priority" in step S2502, the scanning operation control unit 1210 advances the process to step S2508. In step S2508, the scanning operation control unit 1210 requests the operation instruction control unit 1206 to interrupt printing processing in progress. In accordance with this instruction, the operation instruction control unit 1206 instructs the printing operation control unit 1207 to interrupt the printing processing. In step S2509, the scanning operation control unit 1210 waits until it receives, from the operation instruction control unit 1206, a response representing that the printing processing has been suspended or has ended.

If the scanning operation control unit 1210 receives the response from the operation instruction control unit 1206, it advances the process to step S2510. In step S2510, the scanning operation control unit 1210 transfers the scanning control command to the scanning processing unit 1212, and controls the scanning processing unit 1212 to execute scanning processing complying with the scanning control command. After the end of the scanning processing, in step S2511, the scanning operation control unit 1210 transmits the obtained scan data to the scanner driver 1302 (host computer 1000). After the end of the scanning processing and scan data transmission for all original documents, in step S2512, the scanning operation control unit 1210 deletes the corresponding scanning instruction registered in the scanning instruction list 1211.

In step S2513, the operation instruction control unit 1206 determines whether there is printing processing which has been suspended in step S2508. In step S2514, the operation instruction control unit 1206 instructs the printing operation control unit 1207 to restart the printing processing, as needed, and then ends the process.

As described above, according to the fourth embodiment, when the conveyance path for the original document G and the conveyance path for the sheet S are common, the MFP 1 sets, in accordance with a user operation, which of scanning processing and printing processing should be prioritized. If the conveyance path for the original document G and the conveyance path for the sheet S may be common when a printing instruction or scanning instruction is input (received), and if priority is set for processing based on the instruction, the MFP 1 executes the following processing. More specifically, the MFP 1 suspends processing in progress without waiting for the completion of the processing in progress, and executes processing based on the execution instruction. Thus, when the conveyance path for the original document G and the conveyance path for the sheet S may be common in the MFP 1, processing based on the execution instruction can be executed without a collision between the original document G and the sheet S on the conveyance path, and the user friendliness can be improved.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-106317, filed May 7, 2012, which is hereby incorporated by reference herein in its entirety.

What is claimed is:

1. An image forming apparatus comprising:
   a controller, which includes at least a processor, configured to:
   execute reading processing for reading an image on an original document;
   execute printing processing for printing an image on a printing material;
   determine, when execution of the reading processing is instructed by a user while the print processing is being executed, whether or not the printing processing which is being executed uses a conveyance path which is to be used for the reading processing;
   set, in accordance with an instruction from a user, which of the reading processing and the printing processing is preferentially executed; and
   if it is determined that the printing processing which is being executed does not use the conveyance path, control the reading processing to be executed before completion of the printing processing which is being executed, and if it is determined that the printing processing which is being executed uses the conveyance path and it is set to prioritize the printing processing, control the reading processing to be executed after completion of the printing processing which is being executed.

2. The apparatus according to claim 1, wherein the conveyance path is used when the print processing which is being executed is double-sided printing processing, and the conveyance path is not used when the print processing which is being executed is single-sided printing.

3. The apparatus according to claim 1, wherein the controller is further configured to notify, if it is determined that the printing processing which is being executed uses the conveyance path, a user that the reading processing is not able to be executed during execution of the printing processing.

4. The apparatus according to claim 1, wherein the controller is further configured to, after the printing processing of an image on a first surface of the printing material is executed, control the printing material to be conveyed to reverse the printing material via at least part of the conveyance path, and control the printing processing of an image on a second surface of the printing material to be executed.

5. A method of controlling an image forming apparatus having a reading unit configured to execute reading processing for reading an image on an original document and execute printing processing for printing an image on a printing material, comprising:
  determining, when execution of the reading processing is instructed by a user while the print processing is being executed, whether or not the printing processing which is being executed uses a conveyance path which is to be used for the reading processing;
  setting, in accordance with an instruction from a user, which of the reading processing and the printing processing is preferentially executed; and
  if it is determined in the determining that the printing processing which is being executed does not use the conveyance path, control the reading unit to execute the reading processing before completion of the printing processing which is being executed, and if it is determined in the determining that the printing processing which is being executed uses the conveyance path and it is set in the setting to prioritize the printing processing, control the reading unit to execute the reading processing after completion of the printing processing which is being executed.

6. A non-transitory computer-readable storage medium storing a computer program for causing a computer to execute steps of a method of controlling an image forming apparatus having a reading unit configured to execute reading processing for reading an image on an original document and a printing unit configured to execute printing processing for printing an image on a printing material, comprising:
  determining, when execution of the reading processing is instructed by a user while the print processing is being executed, whether or not the printing processing which is being executed uses a conveyance path which is to be used for the reading processing;
  setting, in accordance with an instruction from a user, which of the reading processing and the printing processing is preferentially executed; and
  if it is determined in the determining that the printing processing which is being executed does not use the conveyance path, control the reading unit to execute the reading processing before completion of the printing processing which is being executed, and if it is determined in the determining that the printing processing which is being executed uses the conveyance path and it is set in the setting to prioritize the printing processing, control the reading unit to execute the reading processing after completion of the printing processing which is being executed.

* * * * *